United States Patent
Tahara

(10) Patent No.: US 12,185,030 B2
(45) Date of Patent: Dec. 31, 2024

(54) IMAGE DISPLAY APPARATUS, METHOD FOR GENERATING TRAINED NEURAL NETWORK MODEL, AND COMPUTER PROGRAM

(71) Applicant: SONY GROUP CORPORATION, Tokyo (JP)

(72) Inventor: Hiroyuki Tahara, Tokyo (JP)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/998,539

(22) PCT Filed: Mar. 26, 2021

(86) PCT No.: PCT/JP2021/013002
§ 371 (c)(1),
(2) Date: Nov. 11, 2022

(87) PCT Pub. No.: WO2021/235093
PCT Pub. Date: Nov. 25, 2021

(65) Prior Publication Data
US 2023/0188687 A1   Jun. 15, 2023

(30) Foreign Application Priority Data
May 21, 2020   (JP) .................... 2020-088603

(51) Int. Cl.
*H04N 9/31*      (2006.01)
*G06N 3/08*      (2023.01)

(52) U.S. Cl.
CPC ............. *H04N 9/3155* (2013.01); *G06N 3/08* (2013.01); *H04N 9/3102* (2013.01)

(58) Field of Classification Search
CPC .... H04N 9/3155; H04N 9/3102; G06N 3/045; G06N 3/0464
See application file for complete search history.

(56) References Cited

U.S. PATENT DOCUMENTS 7,068,789 B2 *   6/2006   Huitema .............. H04L 67/104
                                                      713/168
7,614,069 B2 *   11/2009   Stone ............... H04N 21/25435
                                                       725/89

(Continued)

FOREIGN PATENT DOCUMENTS

JP    H08-138025    5/1996
JP    2017-520022   7/2017

(Continued)

OTHER PUBLICATIONS

Agrawal et al., "What is the Range of Surface Reconstructions from a Gradient Field," European Conference on Computer Vision, May 2006, pp. 578-591.

(Continued)

*Primary Examiner* — Michael B. Pierorazio
(74) *Attorney, Agent, or Firm* — SHERIDAN ROSS P.C.

(57) ABSTRACT

Provided is an image display apparatus that projects an image with high contrast by use of a phase modulation technology. An image display apparatus includes a trained neural network model that estimates a phase modulation distribution corresponding to an output target image, a phase modulation section that performs phase modulation on incident light in reference to the phase modulation distribution estimated by the trained neural network model, a luminance modulation section that performs luminance modulation on phase modulated light output from the phase modulation section, and a control section that outputs, to a predetermined position, the incident light subjected to the phase modulation and the luminance modulation.

10 Claims, 25 Drawing Sheets

(56) References Cited

U.S. PATENT DOCUMENTS

| | | | | |
|---|---|---|---|---|
| 7,650,624 | B2* | 1/2010 | Barsoum | H04N 7/081 725/23 |
| 7,721,313 | B2* | 5/2010 | Barrett | H04N 21/4334 725/89 |
| 7,813,822 | B1* | 10/2010 | Hoffberg | H04N 7/163 381/73.1 |
| 8,032,911 | B2* | 10/2011 | Ohkita | H04L 61/5038 725/74 |
| 8,121,706 | B2* | 2/2012 | Morikawa | H04L 12/2814 725/74 |
| 8,949,923 | B2* | 2/2015 | Muvavarirwa | H04N 21/4108 370/332 |
| 10,197,971 | B1* | 2/2019 | Horst | G11C 13/044 |
| 2003/0056093 | A1* | 3/2003 | Huitema | H04L 67/104 713/156 |
| 2004/0117856 | A1* | 6/2004 | Barsoum | G06Q 30/0207 348/E7.071 |
| 2005/0216942 | A1* | 9/2005 | Barton | H04N 21/6125 348/E7.071 |
| 2005/0283815 | A1* | 12/2005 | Brooks | H04H 20/78 725/127 |
| 2005/0289632 | A1* | 12/2005 | Brooks | H04N 7/17309 725/127 |
| 2006/0010481 | A1* | 1/2006 | Wall | H04N 7/163 725/151 |
| 2006/0212197 | A1* | 9/2006 | Butler | B60R 11/0235 701/1 |
| 2006/0225105 | A1* | 10/2006 | Russ | H04N 7/17318 348/E7.071 |
| 2007/0050822 | A1* | 3/2007 | Stevens | H04N 7/14 725/74 |
| 2007/0079341 | A1* | 4/2007 | Russ | H04N 21/43615 725/89 |
| 2007/0101185 | A1* | 5/2007 | Ostrowka | H04N 21/4334 714/6.13 |
| 2007/0130601 | A1* | 6/2007 | Li | H04L 65/611 725/112 |
| 2007/0157281 | A1* | 7/2007 | Ellis | H04N 21/4147 725/74 |
| 2008/0013919 | A1* | 1/2008 | Boston | G11B 19/00 |
| 2008/0022330 | A1* | 1/2008 | Barrett | H04N 21/8352 725/89 |
| 2008/0022331 | A1* | 1/2008 | Barrett | H04N 21/6125 725/89 |
| 2008/0022332 | A1* | 1/2008 | Barrett | H04N 21/4227 725/89 |
| 2008/0155615 | A1* | 6/2008 | Craner | H04N 7/17318 348/E7.071 |
| 2008/0221734 | A1* | 9/2008 | Nagao | G06V 10/56 706/20 |
| 2008/0235587 | A1* | 9/2008 | Heie | H04N 7/142 709/231 |
| 2008/0235733 | A1* | 9/2008 | Heie | H04N 21/482 725/46 |
| 2009/0162032 | A1* | 6/2009 | Patel | H04N 21/8355 386/353 |
| 2010/0107186 | A1* | 4/2010 | Varriale | H04H 60/23 455/410 |
| 2010/0125876 | A1* | 5/2010 | Craner | H04N 21/4331 725/37 |
| 2010/0263013 | A1* | 10/2010 | Asakura | H04N 21/443 725/116 |
| 2010/0296487 | A1* | 11/2010 | Karaoguz | H04W 36/04 370/332 |
| 2010/0313225 | A1* | 12/2010 | Cholas | H04N 21/4402 725/62 |
| 2010/0313226 | A1* | 12/2010 | Cholas | H04N 21/25875 725/98 |
| 2011/0066744 | A1* | 3/2011 | Del Sordo | H04N 21/4305 709/231 |
| 2011/0086619 | A1* | 4/2011 | George | H04M 1/72415 455/414.1 |
| 2011/0103374 | A1* | 5/2011 | Lajoie | H04L 65/612 370/352 |
| 2011/0107364 | A1* | 5/2011 | Lajoie | H04L 65/1023 370/352 |
| 2011/0107379 | A1* | 5/2011 | Lajoie | H04L 65/611 725/151 |
| 2011/0191810 | A1* | 8/2011 | Thomas | H04N 7/106 725/78 |
| 2012/0230649 | A1* | 9/2012 | Craner | H04N 21/4424 386/230 |
| 2013/0198787 | A1* | 8/2013 | Perry, II | H04N 21/2585 725/86 |
| 2017/0109584 | A1* | 4/2017 | Yao | H04N 21/4666 |
| 2017/0254932 | A1* | 9/2017 | Huang | G02F 1/21 |
| 2018/0150704 | A1* | 5/2018 | Lee | G06V 20/58 |
| 2019/0108618 | A1* | 4/2019 | Hwang | G06N 3/08 |
| 2019/0222891 | A1* | 7/2019 | Shen | H04N 21/25875 |
| 2020/0196024 | A1* | 6/2020 | Hwang | H04N 21/2353 |
| 2020/0211229 | A1* | 7/2020 | Hwang | G06N 20/00 |
| 2021/0326690 | A1* | 10/2021 | Pégard | G06V 10/454 |
| 2023/0043791 | A1* | 2/2023 | Supikov | G03H 1/0866 |
| 2023/0205133 | A1* | 6/2023 | Matusik | G03H 1/04 359/9 |
| 2023/0368012 | A1* | 11/2023 | Yu | G02B 5/18 |

FOREIGN PATENT DOCUMENTS

| | | |
|---|---|---|
| WO | WO 2006/078015 | 7/2006 |
| WO | WO-2015184549 A1 | 12/2015 |
| WO | WO-2019215202 A1 | 11/2019 |

OTHER PUBLICATIONS

Frankot et al., "A Method for Enforcing Integrability in Shape from Shading Algorithms," IEEE Transactions on Pattern Analysis and Machine Intelligence, vol. 10, No. 4, Jul. 4, 1988, pp. 439-451.

International Search Report and Written Opinion prepared by the Japan Patent Office on May 17, 2021, for International Application No. PCT/JP2021/013002, 2 pgs.

* cited by examiner

FIG.5
PHASE MODULATION DISTRIBUTION
CALCULATABLE
(LIGHT PROPAGATION MODEL)
COMPUTER-GENERATED
HOLOGRAM FREEFORM METHOD
INTENSITY DISTRIBUTION

IMAGE DISPLAY APPARATUS, METHOD FOR GENERATING TRAINED NEURAL NETWORK MODEL, AND COMPUTER PROGRAM

CROSS REFERENCE TO RELATED APPLICATIONS

This application is a national stage application under 35 U.S.C. 371 and claims the benefit of PCT Application No. PCT/JP2021/013002, having an international filing date of 26 Mar. 2021, which designated the United States, which PCT application claimed the benefit of Japanese Patent Application No. 2020-088603, filed 21 May 2020, the entire disclosures of each of which are incorporated herein by reference.

TECHNICAL FIELD

The technique disclosed herein (hereinafter referred to as the "present disclosure") relates to an image display apparatus that projects an image with high contrast with use of a phase modulation technology, a method for generating a trained neural network model, and a computer program.

BACKGROUND ART

A projection technology for projecting video on a screen has long been known and has the advantage of, for example, allowing the same video to be projected for a plurality of persons at the same time. Recently, improved image quality of content as exemplified by 4K or 8K resolution has led to emergence of projectors compatible with an HDR (High Dynamic Range). For example, there has been proposed a projector that uses a spatial light modulator (SLM) to perform wavefront control on uniform light radiated from a light source, to obtain a desired intensity distribution in which more light rays gather in areas with high luminance, realizing the HDR (see, for example, PTL 1). A freeform method is known as a method for obtaining a smooth phase distribution function suitable for driving the spatial light modulator.

CITATION LIST

Patent Literature

[PTL 1]
Japanese Patent Laid-open No. 2017-520022

Non Patent Literature

[NPL 1]
R. T. Frankot and R. Chellapa, "A method for enforcing integrability in shape from shading algorithms," IEEE Trans. Pattern Anal. Mach. Intelligence, 10(4): 439-451, 1988.
[NPL 2]
A. Agrawal, R. Raskar, and R. Chellapa, "What is the range of surface reconstructions from a gradient field?" in ECCV, 2006, pp. 578-591.

SUMMARY

Technical Problem

An object of the present disclosure is to provide an image display apparatus that projects an image with high contrast with use of a phase modulation technology, a method for generating a trained neural network model, and a computer program.

Solution to Problem

A first aspect of the present disclosure is an image display apparatus including a trained neural network model that estimates a phase modulation distribution corresponding to an output target image, a phase modulation section that performs phase modulation on incident light in reference to the phase modulation distribution estimated by the trained neural network model, a luminance modulation section that performs luminance modulation on phase modulated light output from the phase modulation section, and a control section that outputs, to a predetermined position, the incident light subjected to the phase modulation and the luminance modulation.

The trained neural network model is trained in reference to learning data including a set of an intensity distribution input to the neural network model and a phase modulation distribution used as training data. Alternatively, the neural network model is trained in an unsupervised manner in reference to an error between the intensity distribution input to the neural network model and an intensity distribution calculated from the phase modulation distribution estimated by the neural network model, in reference to a ray optics model.

Further, a second aspect of the present disclosure is a method for generating a trained neural network model that estimates a phase modulation distribution corresponding to a target intensity distribution, the method including an input step of inputting an intensity distribution to a neural network model, an evaluation step of evaluating a phase modulation distribution estimated from the intensity distribution by the neural network model, and a learning step of training the neural network model in reference to a result of the evaluation.

Further, a third aspect of the present disclosure is a method for generating a trained neural network model that estimates a layout of light rays corresponding to a target intensity distribution, the method including an input step of inputting an intensity distribution to a neural network model, an evaluation step of evaluating a layout of light rays estimated from the intensity distribution by the neural network model, and a learning step of training the neural network model in reference to a result of the evaluation.

Further, a fourth aspect of the present disclosure is a computer program described in a computer readable format to execute, on a computer, processing for generating a trained neural network model that estimates a phase modulation distribution corresponding to a desired intensity distribution, the computer program causing a computer to function as an input section that inputs an intensity distribution to a neural network model, an evaluation section that evaluates a result of estimation from the intensity distribution by the neural network model, and a learning section that trains the neural network model in reference to a result of the evaluation.

Further, a fifth aspect of the present disclosure is a computer program described in a computer readable format to execute, on a computer, processing for generating a trained neural network model that estimates a phase modulation distribution corresponding to a target intensity distribution, the computer program causing a computer to function as an input section that inputs an intensity distribution to a neural network model, an evaluation section that evaluates a layout of light rays estimated from the intensity distribution by the neural network model, and a learning section that trains the neural network model in reference to a result of the evaluation.

The computer program according to each of the fourth and fifth aspects of the present disclosure is defined as a computer program described in a computer readable format to implement predetermined processing on the computer. In other words, by installing, in the computer, the computer program according to each of the fourth and fifth aspects of the present disclosure, cooperative effects are exerted on the computer to allow production of effects similar to the effects of the method for generating a trained neural network model according to each of the second and third aspects of the present disclosure.

Advantageous Effect of Invention

According to the present disclosure, there can be provided the image display apparatus that estimates the phase modulation distribution corresponding to the output target image with use of the trained neural network model, realizing increased contrast in real time, and also the method for generating a trained neural network model and the computer program.

Note that the effects described herein are only illustrative and that effects produced by the present disclosure are not limited to the effects described herein. Moreover, in addition to the above-described effects, the present disclosure may exert additional effects.

Still other objects, features, and advantages of the present disclosure will be clarified from detailed description based on embodiments described below and accompanying drawings.

BRIEF DESCRIPTION OF DRAWINGS

FIG. 5 is a diagram depicting calculation for an intensity distribution from a phase modulation distribution and calculation for the phase modulation distribution from the intensity distribution.

DESCRIPTION OF EMBODIMENTS

With reference to the drawings, embodiments of the present disclosure will be described below in detail in the following order.

A. Configuration of projector
B. Phase modulation technology
C. Freeform method

Figure 1:
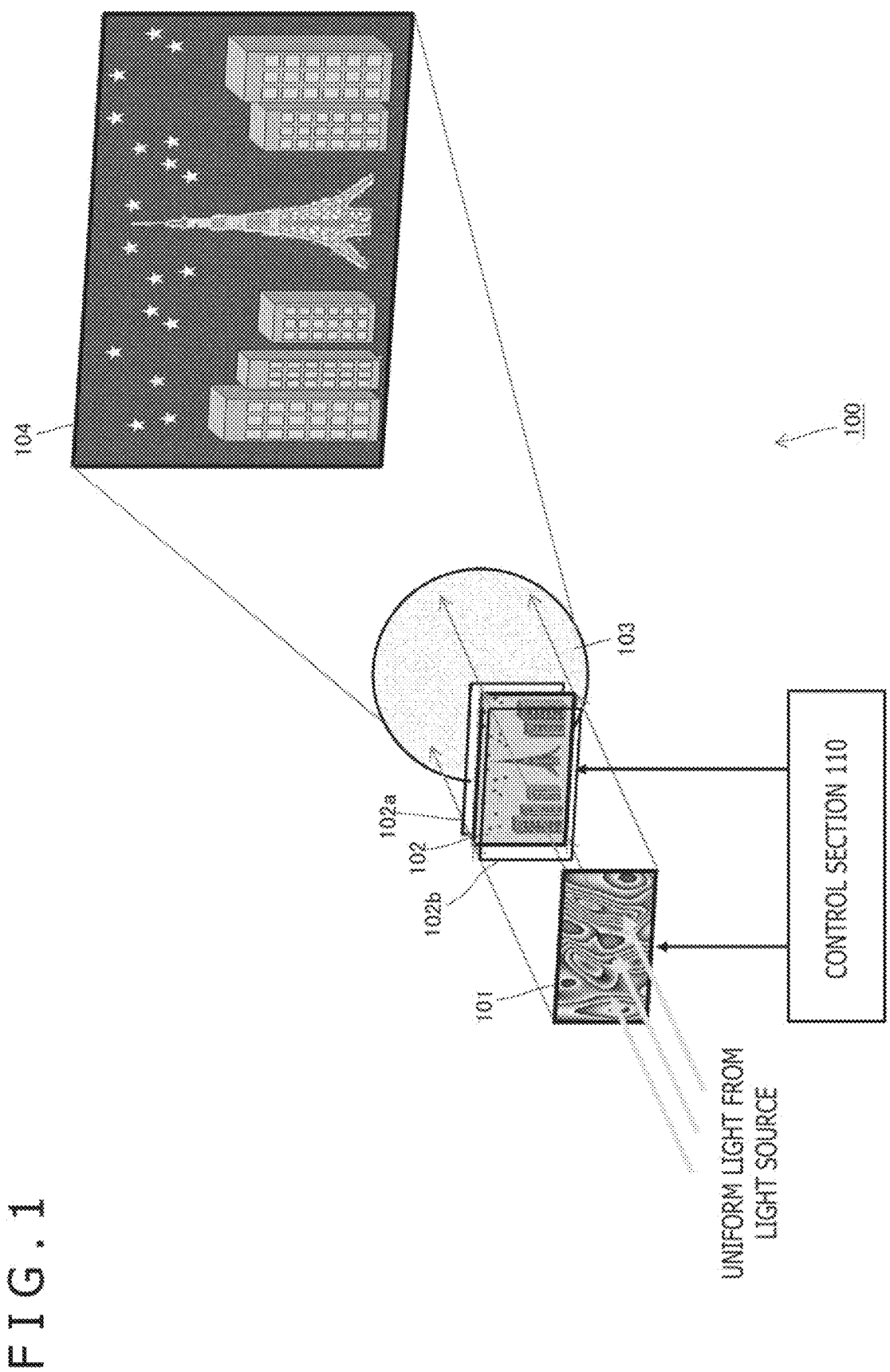
FIG. 1 is a diagram depicting a configuration example of a projector 100.

D. Formulation of intensity distribution in ray optics model
E. Variations in freeform calculation
F. Calculation flow in case of direct estimation of freeform from intensity distribution with use of neural network
G. Calculation flow in case of estimation of grid layout of light rays from intensity distribution with use of neural network, followed by reconstruction of freeform by postprocessing
H. Learning methods for neural network
H-1. Supervised learning
H-1-1. Supervised learning of neural network that estimates grid layout of light rays from intensity distribution
H-1-2. Supervised learning of neural network that estimates freeform from intensity distribution
H-2. Unsupervised learning
H-2-1. Unsupervised learning of neural network that estimates grid layout of light rays from intensity distribution
H-2-2. Unsupervised learning of neural network that estimates freeform from intensity distribution
I. Other applied examples A. Configuration of Projector FIG. 1 schematically depicts a configuration example of a projector 100 that is compatible with an HDR and to which the present disclosure is applied. The projector 100 includes a light source (not depicted) that radiates uniform light, a phase modulation panel 101, a luminance modulation panel 102, an enlarged projection optical system 103, and a control section 110 that controls driving of the phase modulation panel 101 and the luminance modulation panel 102. Light having as uniform an intensity distribution as possible is incident on the phase modulation panel 101 from the light source. The uniform light means light having a uniform distribution of light rays. Light having passed through the phase modulation panel 101 and the luminance modulation panel 102 is projected on a screen 104 via the enlarged projection optical system 103.

A projector incompatible with the HDR is configured such that the projector does not use the phase modulation panel 101 and that uniform light from the light source is directly incident on the luminance modulation panel 102. The luminance modulation panel 102 includes a pattern of an intensity distribution based on luminance components of pixels in a target image, and light having passed through the luminance modulation panel 102 is radiated to the screen 104 to form a projected image of the target image. In this case, the control section 110 controls driving of the luminance modulation panel 102 (that is, a luminance modulation distribution to be formed on the luminance modulation panel 102) in reference to the target image.

In contrast, in the projector 100 compatible with the HDR, the phase modulation panel 101 applies phase modulation to the incident light to form a distribution of light rays corresponding to the intensity distribution of the luminance modulation panel 102. As a result, light incident on the luminance modulation panel 102 has a distribution of light rays in which more light rays concentrate in high luminance areas, realizing the HDR for the projected image. The projector 100 compatible with the HDR can project images with high contrast with high energy efficiency.

In a case where the projector 100 is compatible with the HDR, the control section 110 controls driving of the phase modulation panel 101 and the luminance modulation panel 102 in reference to the target image. Specifically, the control section 110 controls formation of a phase modulation distribution in the phase modulation panel 101 and formation of a luminance modulation distribution in the luminance modulation panel 102, in accordance with the procedure described below.

(Step 1) Setting of Target Image

A target image that is to eventually be displayed on the screen 104 is set.

(Step 2) Setting of Target Intensity Distribution in Luminance Modulation

A target intensity distribution that is to be formed on an exit surface 102a of the luminance modulation panel 102 by emitted light (light transmitted through the luminance modulation panel 102 in a case where the luminance modulation panel 102 is of a transmissive type as depicted in FIG. 1 or light reflected from the luminance modulation panel 102 in a case where the luminance modulation panel 102 is of a reflective type) from the luminance modulation panel 102 such that the target image is displayed on the screen 104 is determined.

(Step 3) Setting of Target Intensity Distribution in Phase Modulation

In this processing step, the target intensity distribution of emitted light from the phase modulation panel 101 on a predetermined image surface is set. In the case of the HDR-compatible projector depicted in FIG. 1, the "predetermined image surface" corresponds to an incident surface 102b of the luminance modulation panel 102. Consequently, in the processing step, to allow the above-described target intensity distribution on the exit surface 102a of the luminance modulation panel 102 to be formed, the target intensity distribution that is to be formed on the incident surface 102b of the luminance modulation panel 102 by emitted light from the phase modulation panel 101 is determined.

(Step 4) Calculation of Phase Modulation Distribution

A phase modulation distribution to be displayed on the phase modulation panel 101 is calculated, the phase modulation distribution causing emitted light from the phase modulation panel 101 to form a target intensity distribution determined in step 3 described above. In the present disclosure, the trained neural network model is used to calculate the phase modulation distribution corresponding to the target intensity distribution. The trained neural network model is mainly characterized by direct estimation of a freeform phase modulation distribution that causes a ray density distribution of light rays emitted from the phase modulation panel 101 to approximate the target intensity distribution on the incident surface 102b of the luminance modulation panel 102. The details of this point will be described later.

(Step 5) Calculation of Luminance Modulation Distribution

The luminance modulation distribution to be displayed on the luminance modulation panel 102 is calculated in reference to the target image on the screen 104 and the phase modulation distribution calculated in step 4 described above. Specifically, when the phase modulation distribution calculated in step 4 described above is displayed on the phase modulation panel 101, an intensity distribution that is to actually be formed on the luminance modulation panel 102 by emitted light from the phase modulation panel 101 is predicted, and in reference to a prediction result, a luminance modulation distribution that causes the target image to be approximated by an image obtained by projecting, on the screen 104, emitted light from the luminance modulation panel 102 is calculated.

B. Phase Modulation Technology

The phase modulation panel is an element that can modulate the phase of incident light for each pixel, and is also referred to as a spatial light modulator (SLM). Phase modulation panels include a liquid-crystal phase modulation panel that modulates phase by varying refractive index for each pixel, a MEMS (Micro Electro Mechanical Systems) phase modulation panel that modulates phase by displacing a micromirror in direction perpendicular to the panel for each pixel, and the like.

Figure 3A:
FIG. 3A is a diagram depicting an example of a phase modulation distribution.
Figure 3B:
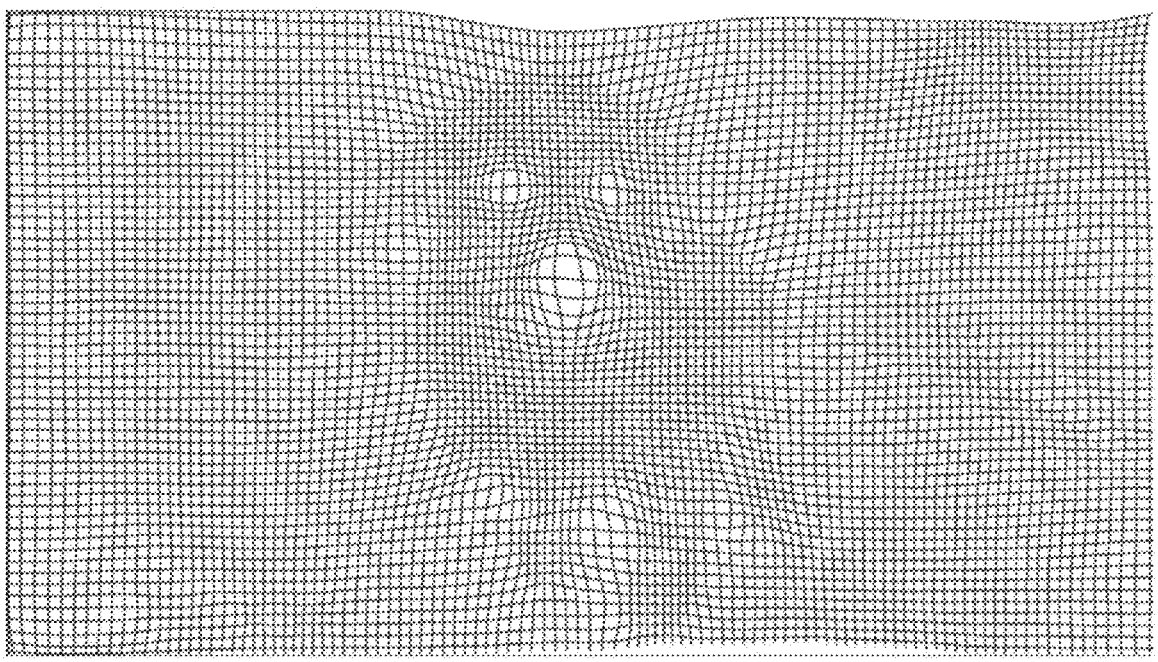
FIG. 3B is a diagram depicting a ray grid with unequal grid intervals realized on an image surface as a result of a group of light rays being bent by the phase modulation distribution depicted in FIG. 3A, the group of light rays having been incident in a uniform distribution parallel to an SLM.
Figure 4A:
FIG. 4A is a diagram depicting sampling values on the ray grid with unequal grid intervals depicted in FIG. 3B, the sampling values being obtained from an intensity distribution reproduced from a phase modulation distribution.
Figure 4B:
FIG. 4B is a diagram depicting sampling values on a ray grid with equal grid intervals, the sampling values being obtained from the intensity distribution reproduced from the phase modulation distribution.

The spatial light modulator can modulate the phase of a light wave to draw an image as nonuniformity of an intensity distribution generated on an image surface used as a propagation destination. FIG. 3A depicts an example of a phase modulation distribution. Further, FIG. 3B depicts a ray grid with unequal grid intervals realized on an image surface as a result of a group of light rays being bent by the phase modulation distribution depicted in FIG. 3A, the group of light rays having been incident in a uniform distribution parallel to the SLM. In the projector 100 depicted in FIG. 1, the phase modulation distribution as depicted in FIG. 3A can be formed by controlling driving of the phase modulation panel 101. FIG. 4A depicts sampling values on the ray grid with unequal grid intervals depicted in FIG. 3B, the sampling values being obtained from an intensity distribution reproduced from the phase modulation distribution. The sampling values indicated in FIG. 4A are calculated as the density distribution of the ray grid with unequal intervals indicated in FIG. 3B. Further, FIG. 4B depicts sampling values on a grid with equal grid intervals, the sampling values being obtained from the intensity distribution reproduced from the phase modulation distribution. The sampling values indicated in FIG. 4B are calculated by resampling, on the grid with equal intervals, the intensity distribution depicted in FIG. 4A. Note that the intensity distributions depicted in FIGS. 4A and 4B are obtained by calculating a reproduced image on the image surface based on the phase modulation distribution depicted in FIG. 3A, as a ray density distribution, in reference to ray optics, and that an actual reproduced image tends to be more blurred than the intensity distributions depicted in FIGS. 4A and 4B. When uniform light is made incident on the phase modulation panel 101 provided with a nonuniform phase modulation distribution as depicted in FIG. 3A, the ray grid with unequal grid intervals as depicted in FIG. 3B is formed.

An intensity distribution reproduced from a certain phase modulation distribution can be calculated using a light propagation model. For example, the reproduction of the intensity distribution depicted in FIG. 4 from the phase modulation distribution depicted in FIG. 3A can be calculated using the light propagation model. Note that an intensity distribution corresponding to an output target image (raw image of a projected image on the screen 104) can be calculated (however, a method for calculating an intensity distribution corresponding to an output target image is not directly associated with the object of the present disclosure and will thus not further be described herein).

In a case where any image is to be reproduced, a phase modulation distribution realizing a certain intensity distribution needs to calculated, conversely to the above description. In other words, the phase modulation distribution for reproducing the intensity distribution depicted in FIG. 4 needs to be calculated.

Precise solution of a phase modulation distribution from an intensity distribution is impossible, and thus, an approximate phase modulation distribution is typically estimated.

Methods for estimating a phase modulation distribution may include a computer-generated hologram (CGH) based on wave optics and a freeform method based on ray optics (see FIG. 5). The CGH performs phase estimation in consideration of an interference phenomenon and is thus excellent in drawing when coherent light is used as an incident light source. However, the CGH needs to discretize calculating regions at small sampling intervals, requiring much calculation time and high calculation costs. On the other hand, in the freeform method, the calculation is adversely affected by interference by a coherent light source, which is not taken into account, thus preventing high frequency components from being drawn in a delicate fashion. For example, PTL 1 proposes an algorithm capable of calculating a phase modulation distribution at high speed with use of the freeform method. However, the algorithm requires repetitive calculations and high calculation costs. Moreover, an intensity distribution reproduced from a phase modulation distribution generated using the algorithm tends to have low contrast.

As such, in the present disclosure, a neural network is used to perform freeform estimation of a phase modulation distribution from an intensity distribution, thus increasing the contrast of a reproduced intensity distribution. In a case where the phase modulation technology is assumed to be applied to the projector 100, phase estimation is required to be performed in real time. Further, according to the present disclosure, the use of the neural network enables phase estimation to be performed at higher speed, while also allowing the real-time property to be satisfied.

C. Freeform Method

Figure 6:
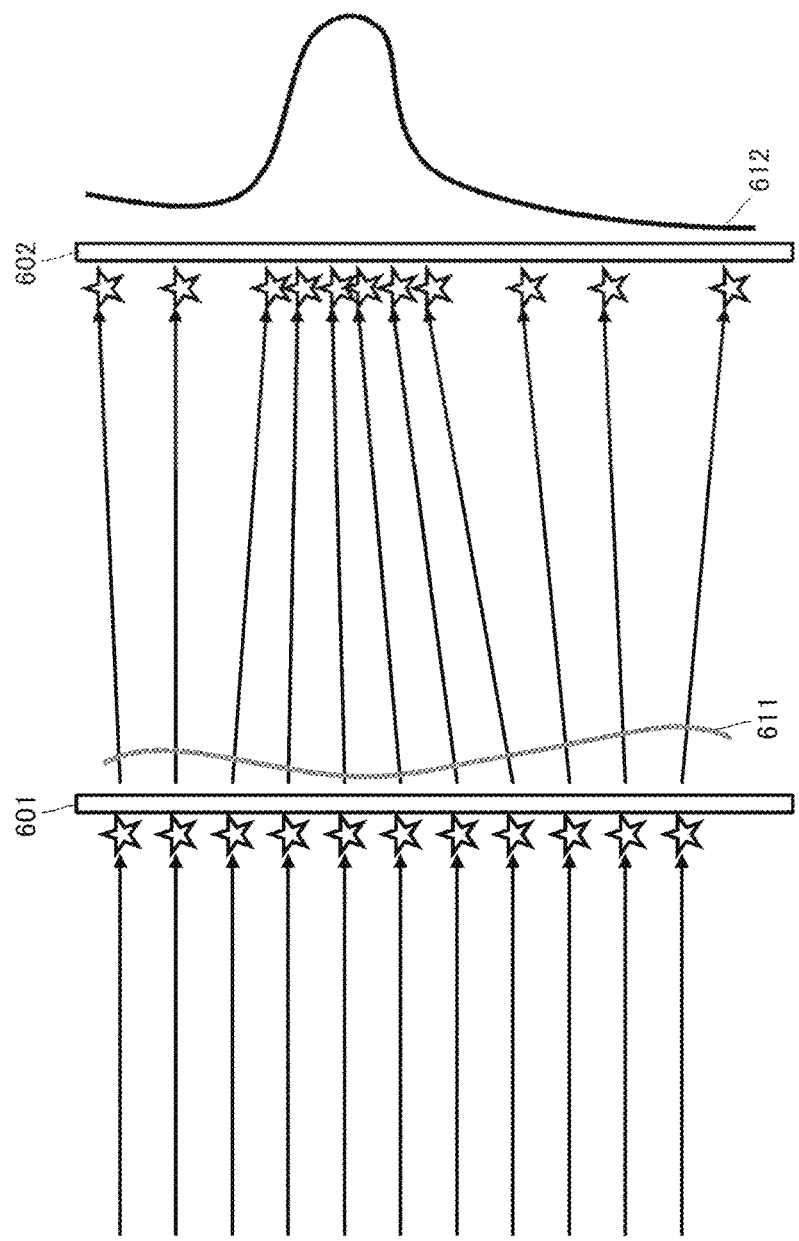
FIG. 6 is a diagram depicting a model for light propagation based on a freeform method.

The freeform method is a method for performing phase estimation with use of a ray optics model. FIG. 6 schematically depicts a light propagation model based on the freeform method. In FIG. 6, reference numeral 601 denotes an SLM surface of the phase modulation panel 101 (spatial light modulator), and reference numeral 602 denotes an image surface of the luminance modulation panel 102.

A group of light rays uniformly distributed parallel to one another is incident on the SLM surface 601. In FIG. 6, the light rays are depicted by arrows. The phase modulation panel 101 is of a liquid crystal type that varies refractive index with pixel, and an exit side of the phase modulation panel 101 forms a smooth free curved surface corresponding to a phase modulation distribution 611. The wavefronts of light rays in the incident light ray group are continuously smoothly distorted by the phase modulation distribution 611 on the SLM surface 601, and the direction of each light ray is bent in the normal direction of the wavefront. As a result, on the image surface 602, the light rays are distributed at unequal intervals, and this ray density distribution forms an intensity distribution 612 of light output from the luminance modulation panel 102.

The freeform method involves calculating, from an intensity distribution, a manner of bending the wavefront such that the ray density distribution is as approximate as possible to the intensity distribution intended to be reproduced. However, the propagation of light is modeled as a refraction phenomenon with diffraction ignored. In the description below, the "freeform" hereinafter refers to a phase modulation distribution itself calculated on the basis of such a ray optics idea or a signal for driving input to the phase modulation panel 101.

D. Formulation of Intensity Distribution in Ray Optics Model

Now, the relation between a phase modulation distribution $P(x, y)$ on the SLM and an intensity distribution I on the image surface used as a propagation destination is formulated in reference to ray optics. Incident light incident on the SLM is a planar wave, and a group of light rays perpendicularly incident on equally spaced grid points $x=(x, y)^T$ on the SLM surface is examined below. Grid points $u=(ux, uy)^T$ at which the group of light rays penetrates the image surface at a distance f from the SLM are expressed as Equation (1) below using the phase modulation distribution $P(x, y)$ on the SLM.

[Math. 1]

$$u = x + f \cdot \nabla P(x,y) \quad (1)$$

Displacement $\Delta u$ between the equally spaced grid points on the SLM surface and grid points on the image surface is expressed as Equation (2).

[Math. 2]

$$\Delta u = \begin{pmatrix} \Delta ux \\ \Delta uy \end{pmatrix} = f \cdot \nabla P(x, y) = \begin{pmatrix} f \frac{\partial}{\partial x} P(x, y) \\ f \frac{\partial}{\partial y} P(x, y) \end{pmatrix} \quad (2)$$

In other words, the displacement $\Delta u$ between the phase modulation distribution $P(x, y)$ and the grid points is in the relation of a scalar field and a gradient field.

Figure 7:
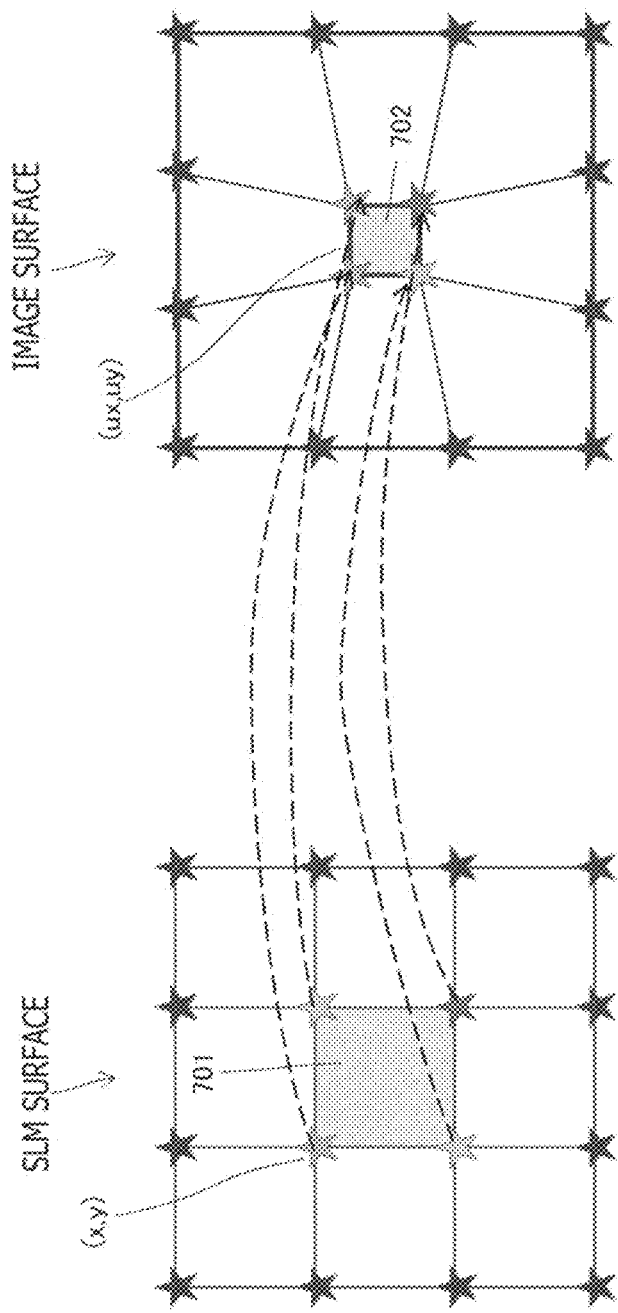
FIG. 7 is a diagram depicting an example of a correspondence relation between a grid on an SLM plane and a grid on an image surface.

With reference to FIG. 7, a square micro region 701 that is enclosed by each of the grid points uniformly distributed on the SLM surface of the phase modulation panel 101 and grid points adjacent to the above-described grid point is examined. A micro region 702 on the image surface of the luminance modulation panel 102 corresponding to the micro region 701 on the SLM surface is a parallelogram. The direction of each light ray in the group of light rays incident on the SLM is bent by wavefront control of the SLM, forming an unequally spaced distribution on the image surface, and thus the grid points on the image surface are unequally spaced apart from one another. The area enlargement rate $m(ux, uy)$ of the micro region 702 with respect to the micro region 701 is calculated by the calculating formula indicated in Equation (3) below.

[Math. 3]

$$m(ux, uy) = \frac{\partial u}{\partial x} \times \frac{\partial u}{\partial y} \quad (3)$$

$$= 1 + f \nabla^2 P(x, y) + f^2 \frac{\partial^2}{\partial x^2} P(x, y) \cdot$$

$$\frac{\partial^2}{\partial y^2} P(x, y) - f^2 \left( \frac{\partial^2}{\partial x \partial y} P(x, y) \right)^2$$

By using Equation (2) above, the area enlargement rate $m(ux, uy)$ indicated in Equation (3) above can be expressed by the grid point displacement $(\Delta ux, \Delta uy)^T$ as indicated in Equation (4) below.

[Math. 4]

$$m(ux, uy) = 1 + \frac{\partial}{\partial x} \Delta ux + \frac{\partial}{\partial y} \Delta uy + \frac{\partial}{\partial x} \Delta ux \cdot \frac{\partial}{\partial y} \Delta uy - \left( \frac{\partial}{\partial y} \Delta ux \right)^2 \quad (4)$$

The calculation is performed using, as a ray density distribution $1/m(ux, uy)$, an electric field intensity $I(ux, uy)$ at each grid point $(ux, uy)$ on the image surface, as indicated in Equations (5) and (6) below.

[Math. 5]

$$I(ux, uy) = \frac{1}{1 + f \nabla^2 P(x, y) + f^2 \frac{\partial^2}{\partial x^2} P(x, y)} \quad (5)$$

$$\frac{\partial^2}{\partial y^2} P(x, y) - f^2 \left( \frac{\partial^2 y}{\partial x, \partial y} P(x, y) \right)^2$$

$$= \frac{1}{1 + \frac{\partial}{\partial x} \Delta ux + \frac{\partial}{\partial y} \Delta uy + \frac{\partial}{\partial x} \Delta ux \frac{\partial}{\partial y} \Delta uy - \left( \frac{\partial}{\partial y} \Delta ux \right)^2} \quad (6)$$

Equation (5) above corresponds to a ray optics model that calculates the intensity distribution $I(ux, uy)$ from the phase modulation distribution $P(x, y)$. Further, Equation (6) above corresponds to a ray optics model that calculates the intensity distribution $I(ux, uy)$ from a grid layout of light rays $\Delta u(\Delta ux, \Delta uy)$.

Here, $I(ux, uy)$ represents an intensity value at the grid point $(ux, uy)$ on the image surface corresponding to a grid point $(x, y)$ on the SLM surface. Note that, in numerical calculation, even in a case where coordinates on the SLM surface are sampled at equally spaced grid points $(x, y)$, $I(ux, uy)$ on the image surface corresponds to sampling values obtained from the intensity distribution at the grid points $(ux, uy)$ unequally spaced from one another. This is because the direction of each light ray in the group of light rays incident on the SLM is bent by wavefront control of the SLM, forming an unequally spaced distribution on the image surface.

In a case where incident light having a nonuniform intensity distribution $I^{(Incident)}$ is to be assumed, the numerator of 1 in Equation (5) or (6) above may be changed to a nonuniform weight $I^{(Incident)}$ for each incident light ray as indicated in Equation (7) or (8).

[Math. 6]

$$I(ux, uy) = \frac{I^{incident}}{1 + f \nabla^2 P(x, y) + f^2 \frac{\partial^2}{\partial x^2} P(x, y)} \quad (7)$$

$$\frac{\partial^2}{\partial y^2} P(x, y) - f^2 \left( \frac{\partial^2 y}{\partial x, \partial y} P(x, y) \right)^2$$

$$= \frac{I^{incident}}{1 + \frac{\partial}{\partial x} \Delta ux + \frac{\partial}{\partial y} \Delta uy + \frac{\partial}{\partial x} \Delta ux \frac{\partial}{\partial y} \Delta uy - \left( \frac{\partial}{\partial y} \Delta ux \right)^2} \quad (8)$$

As in Equation (5) above, Equation (7) above corresponds to a ray optics model that calculates the intensity distribution $I(ux, uy)$ from the phase modulation distribution $P(x, y)$. Further, as in Equation (6) above, Equation (8) above corresponds to a ray optics model that calculates the intensity distribution $I(ux, uy)$ from the grid layout of light rays $\Delta u(\Delta ux, \Delta uy)$.

Further, a grid point u on the image surface indicated in Equation (1) above can be deformed as in Equation (9) below.

[Math. 7]

$$u = x + (f/a) \cdot \nabla P[a(x,y)] \quad (9)$$

In Equation (9) above, "a" is a positive integer. Equation (9) above indicates that a certain phase modulation distribution P multiplied by "a" leads to the same layout of grid points of light rays as that of the original phase modulation distribution on a surface at a projection distance multiplied by 1/a. Hence, by calculating a phase modulation distribution on the assumption of a certain projection distance and subsequently multiplying the phase modulation distribution by a constant, the projection distance of the reproduced image can be changed.

E. Variations in Freeform Calculation

In the present disclosure, the trained neural network is used to perform freeform estimation of a phase modulation distribution from an intensity distribution. The use of the neural network enables phase estimation to be performed at higher speed, while also allowing the real-time property to be satisfied. Further, by using the neural network to perform freeform estimation of a phase modulation distribution from an intensity distribution, the contrast of the reproduced intensity distribution is increased.

Figure 2:
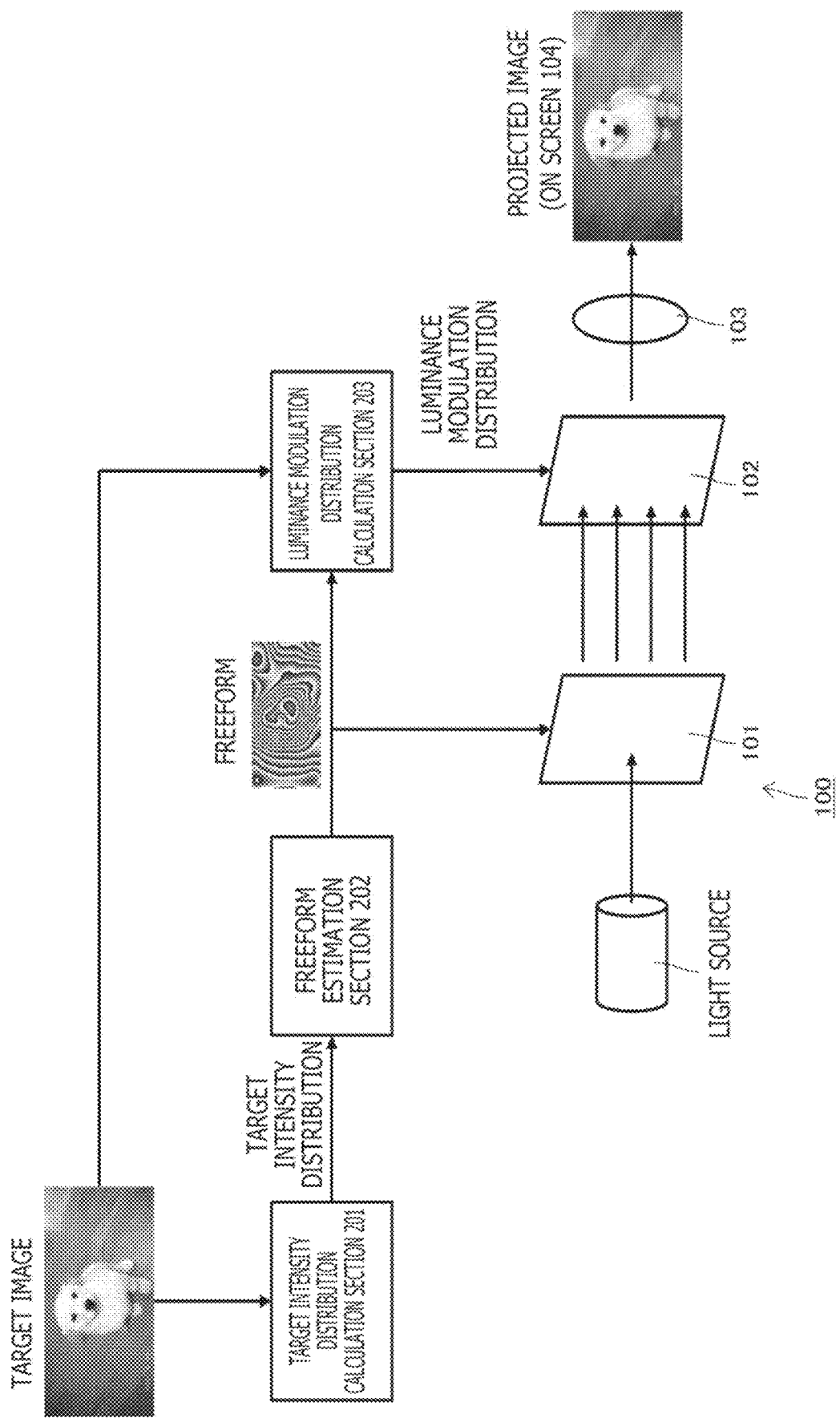
FIG. 2 is a diagram depicting a configuration example of the projector 100 including a freeform estimation section using a trained neural network.

FIG. 2 depicts a configuration example of the projector 100 configured to estimate a freeform with use of the trained neural network. The projector 100 depicted in FIG. 2 includes a target intensity distribution calculation section 201, a freeform estimation section 202, and a luminance modulation distribution calculation section 203, in addition to the phase modulation panel 101, the luminance modulation panel 102, the enlarged optical system 103, and the screen 104. The phase modulation panel 101, the luminance modulation panel 102, the enlarged optical system 103, and the screen 104 have already been described, and the detailed description thereof is omitted here.

The target intensity distribution calculation section 201 calculates, in reference to the target image to eventually be displayed on the screen 104, the target intensity distribution in the phase modulation, that is, the target intensity distribution to be formed on the incident surface 102b of the luminance modulation panel 102 by emitted light from the phase modulation panel 101.

The freeform estimation section 202 estimates the phase modulation distribution to be displayed on the phase modulation panel 101, that is, a freeform, such that emitted light from the phase modulation panel 101 forms the target intensity distribution calculated by the target intensity distribution calculation section 201. In the present disclosure, the freeform estimation section 202 uses a trained neural network model to estimate a freeform. The trained neural network model is mainly characterized by direct estimation of a freeform phase modulation distribution that causes the ray density distribution emitted from the phase modulation panel 101 to approximate the target intensity distribution on the incident surface 102b of the luminance modulation panel 102, and this will be described later in detail. The freeform estimation section 202 is, for example, incorporated into the control section 110 depicted in FIG. 1.

The luminance modulation distribution calculation section 203 calculates the luminance modulation distribution to be displayed on the luminance modulation panel 102, in reference to the target image on the screen 104 and the freeform estimated by the freeform estimation section 202. Specifically, when the freeform estimated by the trained neural network model with the freeform estimation section 202 is displayed on the phase modulation panel 101, an intensity distribution that is to actually be formed on the luminance modulation panel 102 by emitted light from the phase modulation panel 101 is predicted, and in reference to the result of the prediction, a luminance modulation distribution that causes the target image to be approximated by the image obtained by projecting emitted light from the luminance modulation panel 102 on the screen 104 is calculated. Here, the luminance modulation distribution calculation section 203 uses the freeform for calculation of the luminance modulation distribution because of the need to take into account the result of simulation for determining what kind of intensity distribution is to actually be formed on the incident surface 102b of the luminance modulation panel 102 when the freeform is displayed on the phase modulation panel 101. The intensity distribution calculation section 203 is, for example, incorporated into the control section 110 depicted in FIG. 1.

Variations related to the calculation of the freeform will be described below, the variations being applied by the freeform estimation section 202.

(1) Variation related to freeform calculation flow (1-1) The neural network is used to directly estimate a freeform from an intensity distribution of an output target.

(1-2) The neural network is used to estimate a grid layout of light rays from the intensity distribution of the output target. The grid layout of light rays is data equivalent to the phase modulation distribution (the phase modulation distribution is a scalar field, whereas the grid layout is a gradient field corresponding to the scalar field). In postprocessing, the phase modulation distribution is reconstructed from the estimated grid layout of light rays.

(2) Variations related to learning method of neural network (2-1) Supervised learning (2-1-1) The neural network that estimates the grid layout on the SLM surface is trained in a supervised manner.

(2-1-2) The neural network that directly outputs a freeform is trained in a supervised manner.

(2-2) Unsupervised learning By using the ray optics model as a guide, the neural network is trained in an unsupervised manner.

(2-2-1) In a case where a neural network that estimates the grid layout on the SLM surface is trained in an unsupervised manner:

(2-2-1-1) Output from the ray optics model includes an intensity distribution.

(2-2-1-2) Output from the ray optics model is the reciprocal of the intensity distribution.

(2-2-2) In a case where a neural network that directly outputs a freeform is trained in an unsupervised manner:

(2-2-2-1) Output from the ray optics model includes an intensity distribution.

(2-2-2-2) Output from the ray optics model includes the reciprocal of the intensity distribution.

Methods for calculating a freeform in the respective variations will sequentially be described below.

Figure 8:
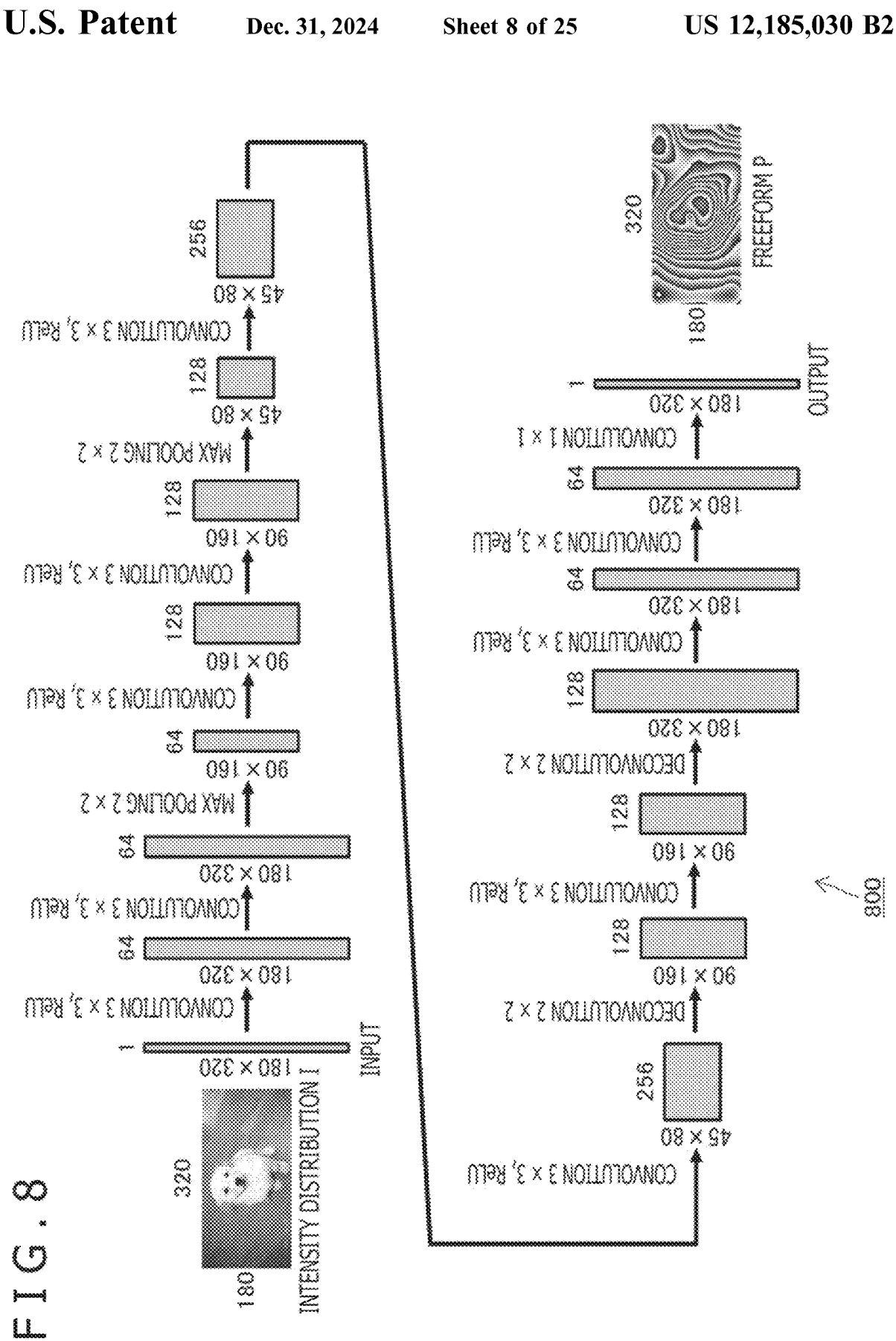
FIG. 8 is a diagram depicting an example of a structure of a neural network 800 that directly estimates a freeform from an intensity distribution of an output target.

F. Calculation Flow in Case of Direct Estimation of Freeform from Intensity Distribution with Use of Neural Network FIG. 8 depicts an example of a structure of a neural network 800 that directly estimates a freeform from an intensity distribution of an output target. The neural network 800 is specified to receive a standardized intensity distribution as input such that an average intensity value is a certain constant (for example, 1) and output a freeform (a signal for driving to be input to the phase modulation panel 101). Note that, in the following description, the intensity distribution input to the neural network is intended to mean a standardized intensity distribution unless otherwise noted.

For example, in a case where calculation resolution is M×N, input to the neural network 800 may be an M×N one-channel array, and output to the neural network 800 may be an M×N one-channel array, as illustrated in FIG. 8. Alternatively, the input to and output from the neural network 800 may be made one dimensional, and the input may be an MN×1 vector, with the output an MN×1 vector. The network structure of a hidden layer of the neural network 800 is not particularly limited to any type (the network structure may be of a convolutional type or a fully-connected type).

Figure 9:
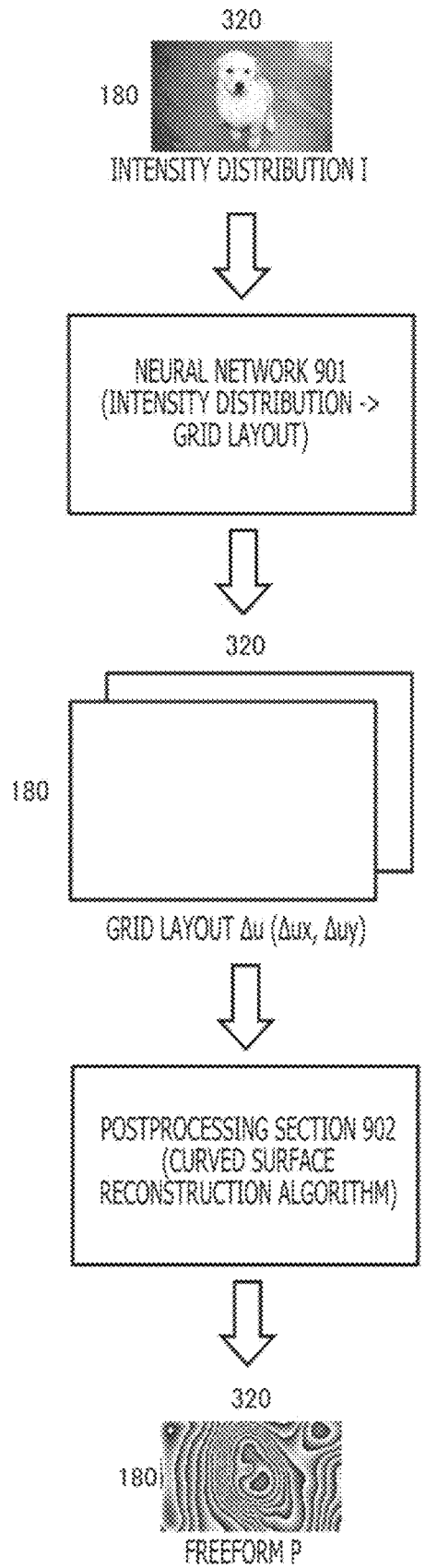
FIG. 9 is a diagram depicting a calculation flow in which the neural network is used to estimate a grid layout of light rays from an intensity distribution and in which a freeform is then reconstructed by postprocessing.

G. Calculation Flow in Case of Estimation of Grid Layout of Light Rays from Intensity Distribution with Use of Neural Network, Followed by Reconstruction of Freeform by Postprocessing FIG. 9 depicts a calculation flow in which the neural network 901 is used to estimate, from the intensity distribution of the output target, information related to a grid layout of light rays and in which a phase modulation distribution is reconstructed by postprocessing in reference to information related to the estimated grid layout of light rays.

The information related to the grid layout of light rays and output from the neural network 901 may be either the displacement $\Delta u(\Delta ux, \Delta uy)$ between the equally spaced grid points (x, y) on the SLM surface and the corresponding grid points (ux, uy) on the image surface or the grid points (ux, uy) on the image surface corresponding to the grid points (x, y) on the SLM surface. The information related to the grid layout of light rays is hereinafter described as the displacement $\Delta u(\Delta ux, \Delta uy)$ of the grid points (x, y), and the displacement $\Delta u(\Delta ux, \Delta uy)$ is hereinafter referred to as the grid layout.

As described above in item D., the freeform (or the phase modulation distribution P(x, y)) and the grid layout $\Delta u$ are in the relation of the scalar field and the gradient field. Consequently, a postprocessing section 902 that calculates the freeform from the grid layout $\Delta u(\Delta ux, \Delta uy)$ output by the neural network 901 may use an algorithm that reconstructs a curved surface from the gradient field (see, for example, NPL 1 and NPL 2).

Figure 10:
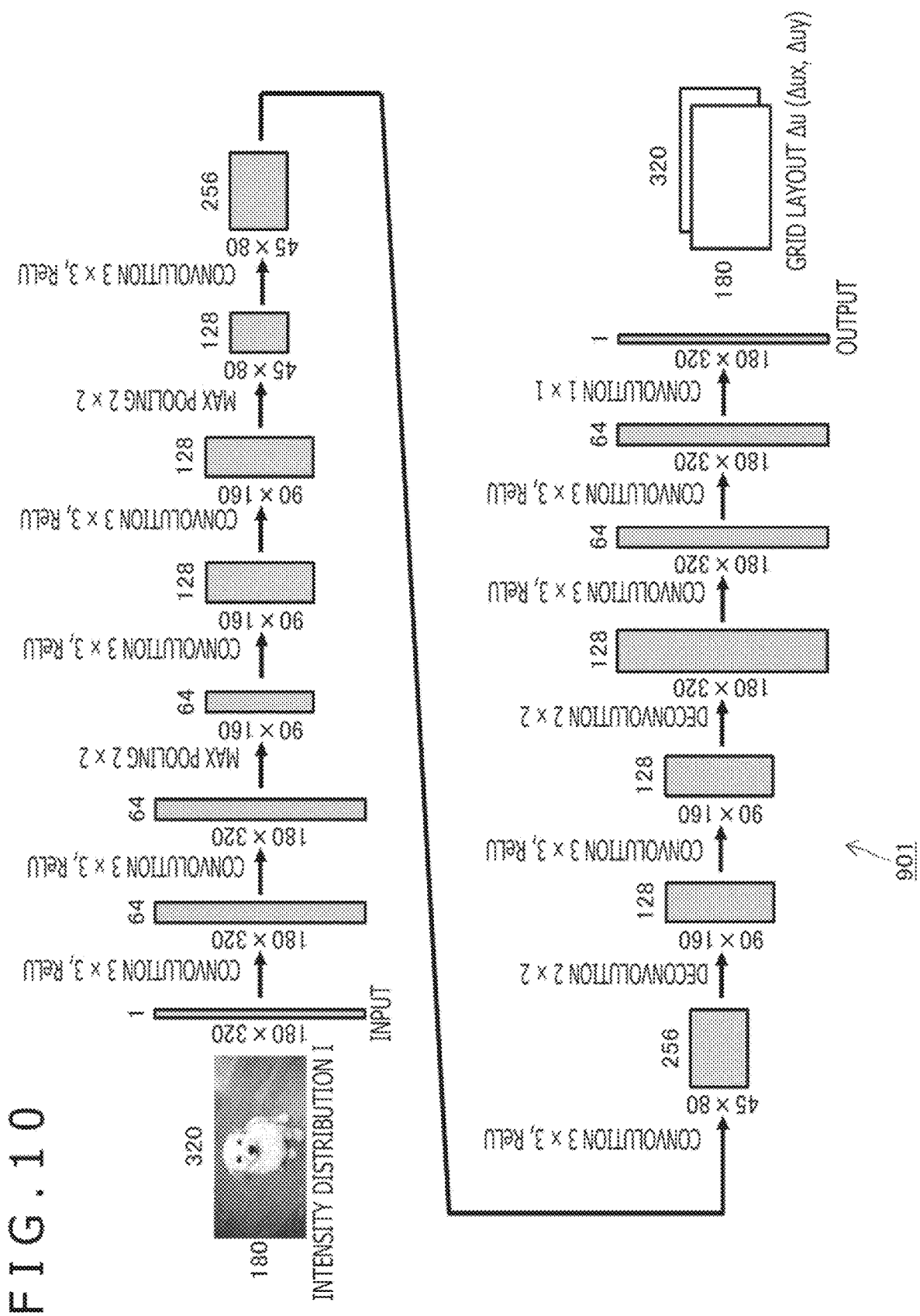
FIG. 10 is a diagram depicting an example of a structure of a neural network 901 that estimates a grid layout of light rays from an intensity distribution of an output target.

FIG. 10 depicts an example of a structure of the neural network 901 that estimates a grid layout of light rays from an intensity distribution of an output target. The neural network 901 is specified to receive an intensity distribution as input and output a grid layout of light rays.

For example, in a case where the calculation resolution is M×N, the input to the neural network 901 may be an M×N one-channel array, and the output from the neural network 901 may be an M×N two-channel array (each channel represents the grid point displacement ($\Delta ux, \Delta uy$)), as illustrated in FIG. 10. Alternatively, the input to and output from the neural network 901 may be made one dimensional, and the input may be an MN×1 vector, whereas the output may be an 2 MN×1 vector. The network structure of a hidden layer of the neural network 901 is not particularly limited to any type (the network structure may be of the convolutional type or the fully-connected type).

H. Learning Methods for Neural Network

H-1. Supervised Learning

Figure 11:
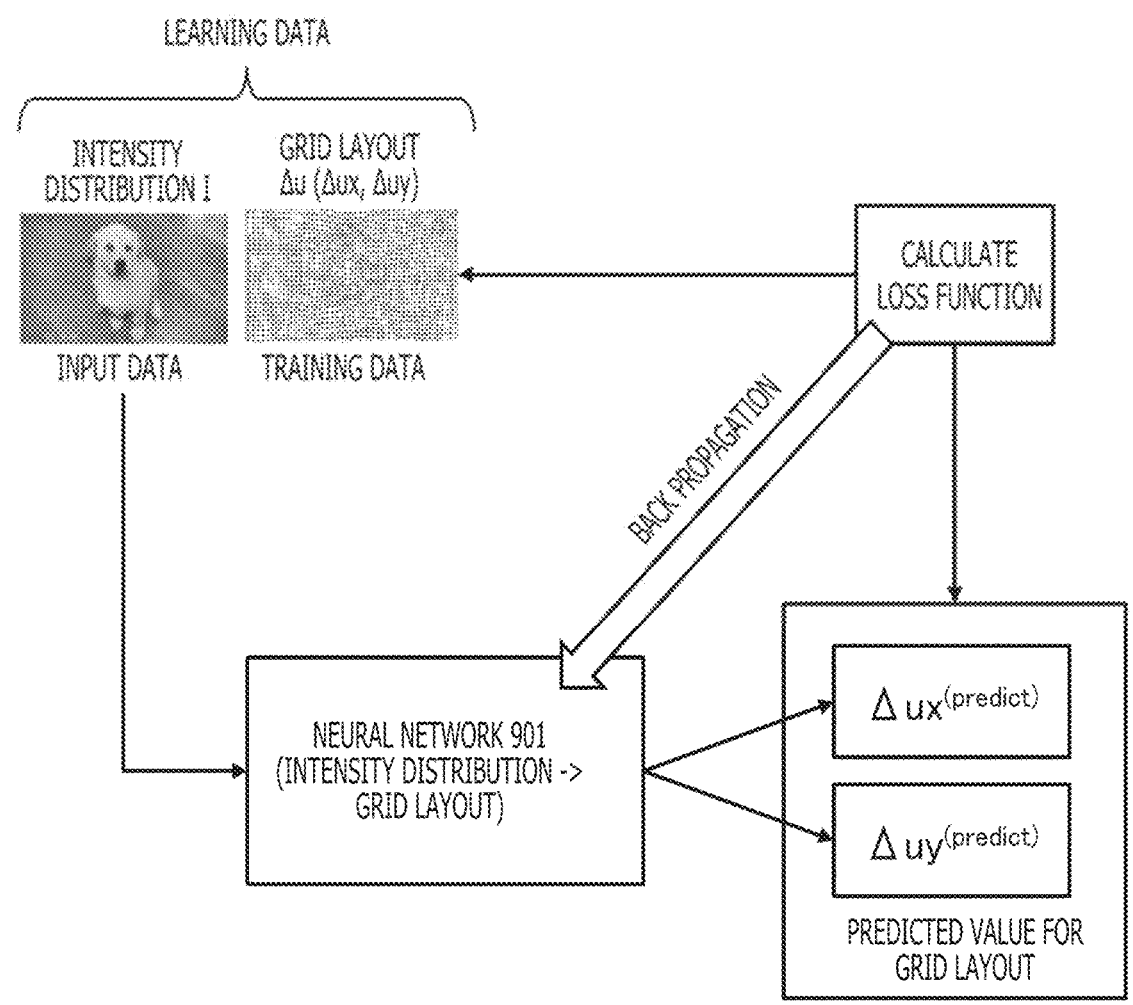
FIG. 11 is a diagram depicting a mechanism of supervised learning of the neural network 901 that estimates a grid layout of light rays from an intensity distribution.

H-1-1. Supervised Learning of Neural Network that Estimates Grid Layout of Light Rays from Intensity Distribution FIG. 11 depicts a mechanism of supervised learning of the neural network 901 (see FIG. 10) that estimates a grid layout of light rays from an intensity distribution. Learning data including a set of an intensity distribution (data input to the neural network 901) and a grid layout (training data) is collected in advance. When the intensity distribution corresponding to the input data of the learning data is input to the neural network 901, a predicted value for the grid layout $\Delta u^{(predict)}(\Delta ux^{(predict)}, \Delta uy^{(predict)})$ is output from the neural network 901. A loss function based on an error between the grid layout predicted by the neural network 901 and the grid layout of the training data is defined, and the neural network 901 is trained with use of back propagation (error back propagation) in such a manner as to minimize the loss function.

The loss function used serves as an indicator for an error between the grid layout $\Delta u^{(predict)}(\Delta ux^{(predict)}, \Delta uy^{(predict)})$ predicted by the neural network 901 and the grid layout $\Delta u(\Delta ux, \Delta uy)$ of the training data. The loss function used may be, for example, a mean square error (MSE) $L_{MSE}$ indicated in Equation (10) below or a mean absolute error (MAE) $L_{MAE}$ indicated in Equation (11) below.

[Math. 8]

$$L_{MSE} = \frac{1}{N}\sum_n\sum_k \left\{ \left|\Delta ux_{n,k}^{(predict)} - \Delta ux_{n,k}\right|^2 + \left|\Delta uy_{n,k}^{(predict)} - \Delta uy_{n,k}\right|^2 \right\} \quad (10)$$

[Math. 9]

$$L_{MAE} = \frac{1}{N}\sum_n\sum_k \left\{ \left|\Delta ux_{n,k}^{(predict)} - \Delta ux_{n,k}\right| + \left|\Delta uy_{n,k}^{(predict)} - \Delta uy_{n,k}\right| \right\} \quad (11)$$

In Equations (10) and (11) above, n is an index representing each individual data sample in a mini batch selected from the learning data in each learning step, and k is an index representing a sheet for array data or vector data. Further, N is a mini batch size.

Learning data including a set of an intensity distribution and a grid layout preferably includes an enormous amount of data. The learning data may be created with use of any freeform calculation algorithm or by random setting of a freeform first and collection of a set of a grid layout and an intensity distribution calculated from the freeform. In either of the methods, Equation (6) or (8) above related to the ray optics model may be used to calculate an intensity distribution from the grid layout. Note that, as described above in item D., the intensity distribution I(ux, uy) calculated by the ray optics model includes sampling values of the grid points (ux, uy) unequally spaced from one another on the image surface, and thus input data needs to be obtained by resampling the intensity distribution I(ux, uy) at equally spaced grid points on the image surface.

Figure 12:
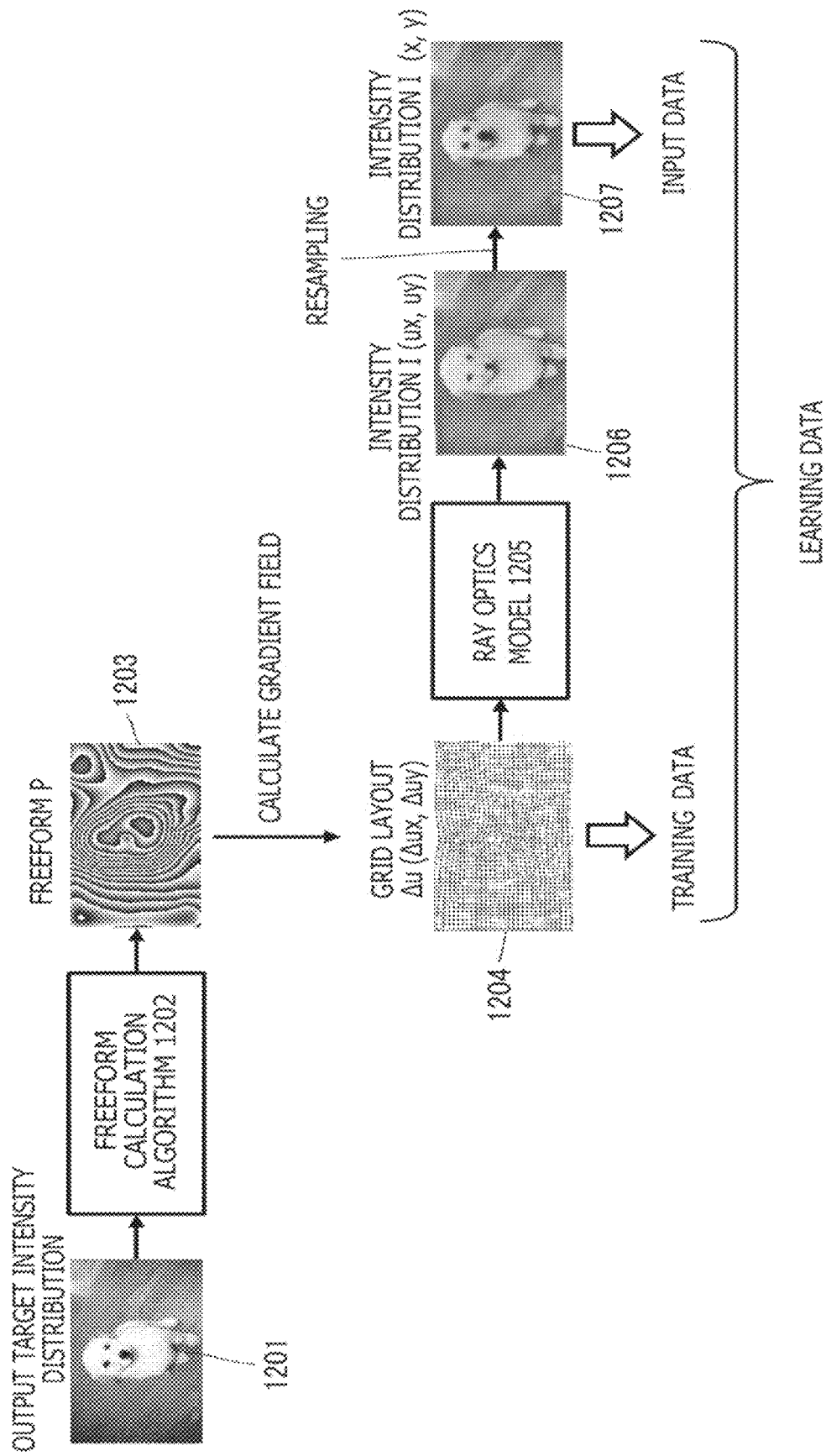
FIG. 12 is a diagram depicting a method for collecting learning data including a set of an intensity distribution and a grid layout.

FIG. 12 depicts an example of a method for collecting learning data including a set of an intensity distribution and a grid layout.

An optional freeform calculation algorithm 1202 is used to calculate a freeform 1203 from an output target intensity distribution 1201 collected in advance. Then, gradient field calculation is executed on the calculated freeform 1203 to calculate a grid layout 1204.

Depending on the freeform calculation algorithm 1202 used to calculate the freeform 1203, the correspondence relation in the set of the output target intensity distribution 1201 and the grid layout 1204 may deviate significantly from the physically correct correspondence relation. Consequently, the set of the output target intensity distribution 1201 and the grid layout 1204 is not desirable as learning data.

As such, the ray optics model 1205 indicated in Equation (6) or (8) above is used to calculate an intensity distribution 1206 from the grid layout 1204. Further, the intensity distribution 1206 calculated by the ray optics model 1205 includes sampling values of the grid points (ux, uy) unequally spaced from one another on the image surface, and thus an intensity distribution 1207 is determined by resampling at equally spaced grid points (x, y) on the image surface. Then, the set of the resampled intensity distribution 1207 (input data) and the grid layout 1204 (training data) is determined to be learning data for the neural network 901.

Figure 13:
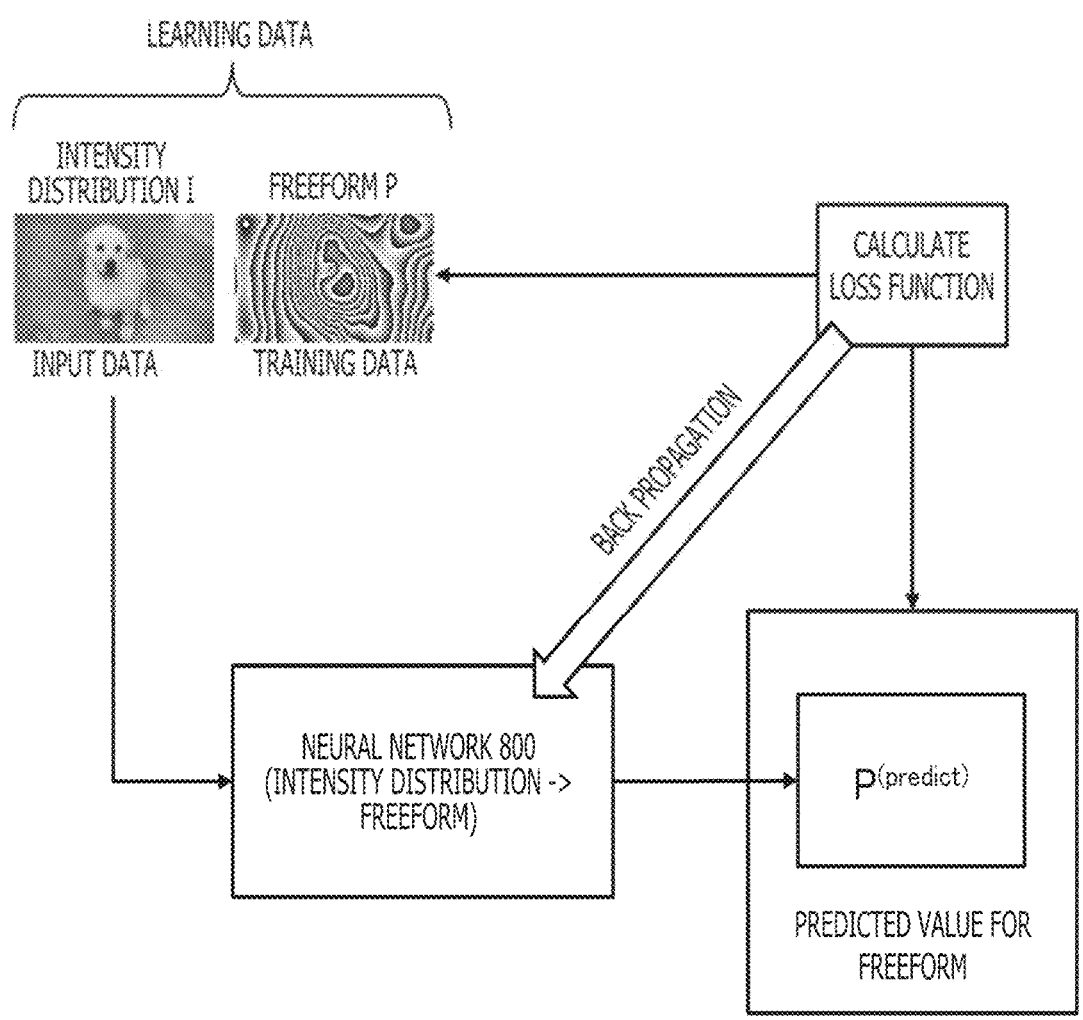
FIG. 13 is a diagram depicting a mechanism of supervised learning of the neural network 800 that estimates a freeform from an intensity distribution.

H-1-2. Supervised Learning of Neural Network that Estimates Freeform from Intensity Distribution FIG. 13 depicts a mechanism of supervised learning of the neural network 800 (see FIG. 8) that estimates a freeform from an intensity distribution. Learning data including a set of an intensity distribution (data input to the neural network 800) and a grid layout (training data) is collected in advance. When the intensity distribution corresponding to the input data of the learning data is input to the neural network 800, a predicted value for a freeform is output from the neural network 800. A loss function based on an error between the freeform predicted by the neural network 800 and the freeform of the training data is defined, and the neural network 800 is trained using back propagation in such a manner as to minimize the loss function.

The loss function used serves as an indicator for an error between the freeform $P^{(predict)}$ predicted by the neural network 800 and the freeform P of the training data. The loss function used may be, for example, a mean square error (MSE) $L_{MSE}$ indicated in Equation (12) below or a mean absolute error (MAE) $L_{MAE}$ indicated in Equation (13).

[Math. 10]

$$L_{MSE} = \frac{1}{N}\sum_{n}\sum_{k}\left\{\left|P_{n,k}^{(predict)} - P_{n,k}\right|^2\right\} \quad (12)$$

[Math. 11]

$$L_{MAE} = \frac{1}{N}\sum_{n}\sum_{k}\left\{\left|P_{n,k}^{(predict)} - P_{n,k}\right|\right\} \quad (13)$$

Learning data including a set of an intensity distribution and a grid layout preferably includes an enormous amount of data. The learning data may be created by use of any freeform calculation algorithm or by random setting of a freeform first and collection of a set of a freeform and an intensity distribution calculated from the freeform. In either of the methods, Equation (5) or (7) above related to the ray optics model may be used to calculate an intensity distribution from the freeform.

Figure 14:
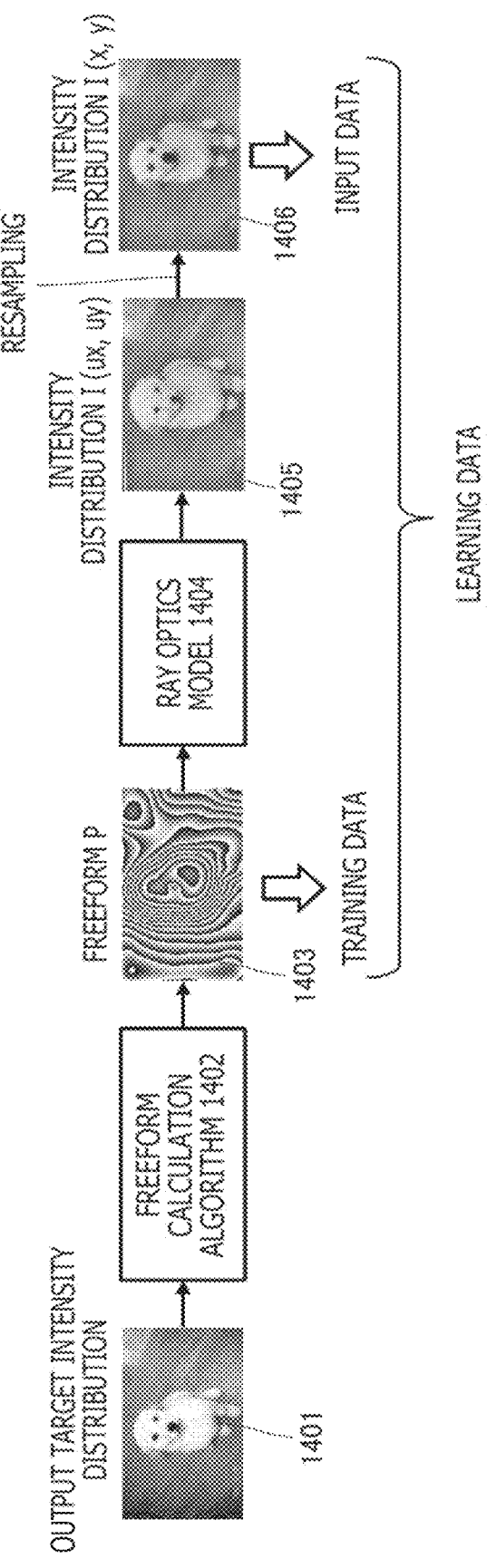
FIG. 14 is a diagram depicting a method for collecting learning data including a set of an intensity distribution and a freeform.

FIG. 14 depicts an example of a method for collecting learning data including a set of an intensity distribution and a freeform.

An optional freeform calculation algorithm 1402 is used to calculate a freeform 1403 from an output target intensity distribution 1401 collected in advance.

Depending on the freeform calculation algorithm 1402 used to calculate the freeform 1403, the correspondence relation in the set of the output target intensity distribution 1401 and the freeform 1403 deviates significantly from a physically correct correspondence relation. Consequently, the set of the output target intensity distribution 1401 and the freeform 1403 is not desirable as learning data.

As such, the ray optics model 1404 indicated in Equation (5) or (7) above is used to calculate the intensity distribution 1405 from the freeform 1403. Further, the intensity distribution 1405 calculated by the ray optics model 1404 includes sampling values of the grid points (ux, uy) unequally spaced from one another on the image surface, and thus an intensity distribution 1406 is determined by resampling at equally spaced grid points (x, y) on the image surface. Then, the set of the resampled intensity distribution 1406 (input data) and the freeform 1403 (training data) is determined to be learning data for the neural network 800.

H-2. Unsupervised Learning

Using the ray optics model as a guide allows the neural network to be trained in an unsupervised manner.

H-2-1. Unsupervised Learning of Neural Network that Estimates Grid Layout of Light Rays from Intensity Distribution Possible is a method in which output from the ray optics model used as a guide includes an intensity distribution, and also a method in which output from the ray optics model used as a guide includes the reciprocal of the intensity distribution. First, description will be given of a method for training the neural network in an unsupervised manner in which output from the ray optics model used as a guide includes an intensity distribution.

Figure 15:
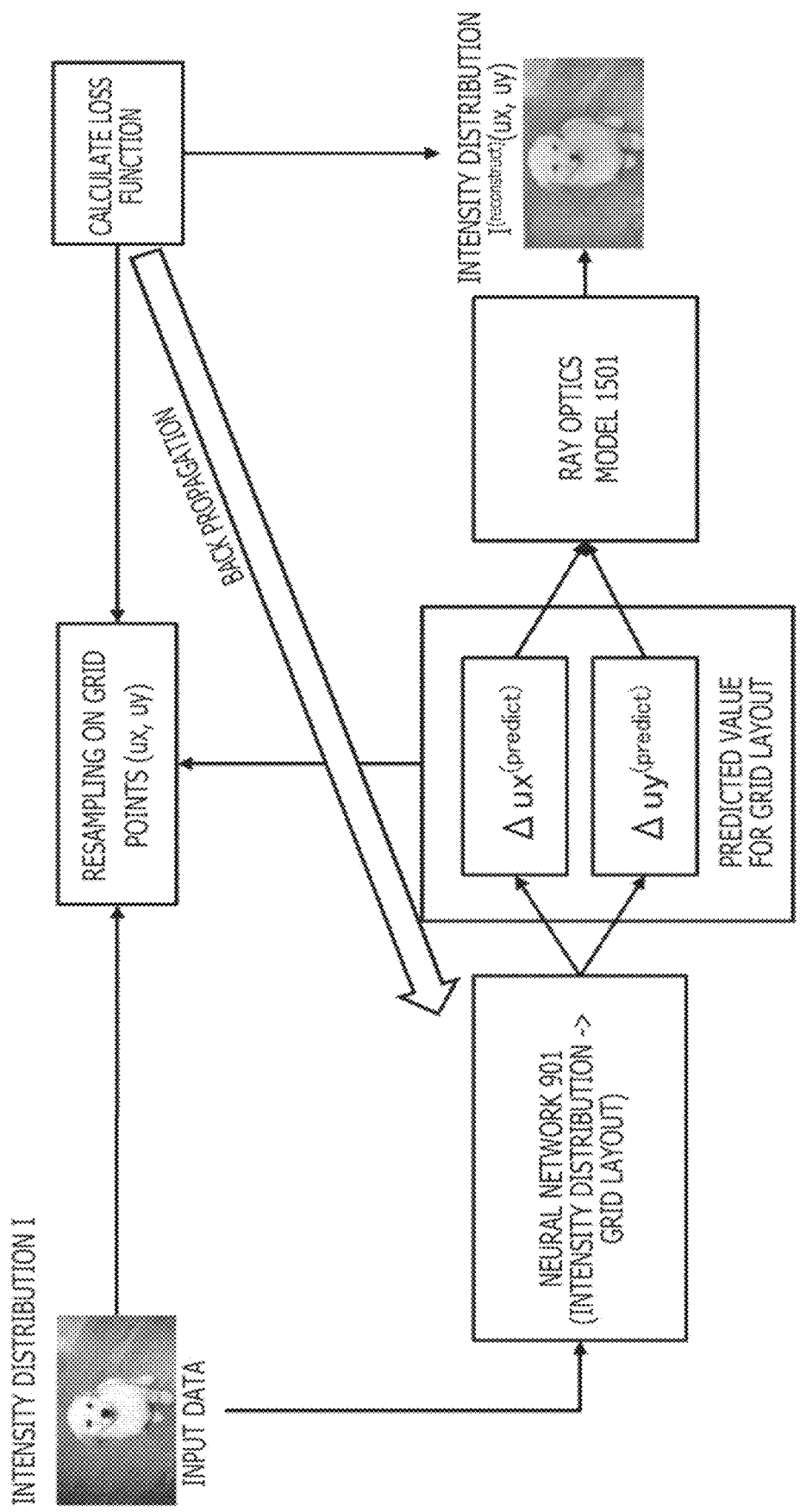
FIG. 15 is a diagram depicting a mechanism of unsupervised learning of the neural network 901 that estimates a grid layout of light rays from an intensity distribution.

FIG. 15 depicts a mechanism of unsupervised learning of the neural network 901 (see FIG. 10) estimating a grid layout of light rays from an intensity distribution (case in which output from the ray optics model includes an intensity distribution).

When the intensity distribution I(x, y) corresponding to the input data of learning data is input to the neural network 901, the predicted value for the grid layout $\Delta u^{(predict)}$ ($\Delta ux^{(predict)}$, $\Delta uy^{(predict)}$) is output from the neural network 901. Then, a ray optics model 1501 indicated in Equation (6) or (8) above is used as a guide to reconstruct an intensity distribution $I^{reconstruct}$ (ux, uy) from the predicted value for the grid layout $\Delta u^{(predict)}$($\Delta ux^{(predict)}$, $\Delta uy^{(predict)}$).

The intensity distribution $I^{reconstruct}$ (ux, uy) reconstructed from the ray optics model 1501 includes sampling values for the unequally spaced grid points u(ux, uy) on the image surface. Hence, the intensity distribution I(ux, uy) that is obtained by resampling the intensity distribution I(x, y) corresponding to input data, on grid points u(ux, uy) estimated by the neural network 901, is determined. Then, a loss function that is based on an error between the intensity distribution I(ux, uy) of the resampled input data and the intensity distribution $I^{reconstruct}$(ux, uy) reconstructed from the predicted value for the grid layout $\Delta u^{(predict)}$($\Delta ux^{(predict)}$, $\Delta uy^{(predict)}$) output from the neural network 901 is calculated, and the neural network 901 is trained by back propagation in such a manner as to minimize the loss function. The loss function used may serve as an indicator for the error between the reconstructed intensity distribution $I^{reconstruct}$(ux, uy) and the input intensity distribution I(ux, uy) obtained by resampling on the grid points u(ux, uy).

Note that, when the intensity distribution $I^{reconstruct}$(ux, uy) reconstructed with use of the ray optics model 1501 is resampled at equally spaced grid points (x, y), error back-propagation is disabled and thus this method fails to be employed.

Figure 16:
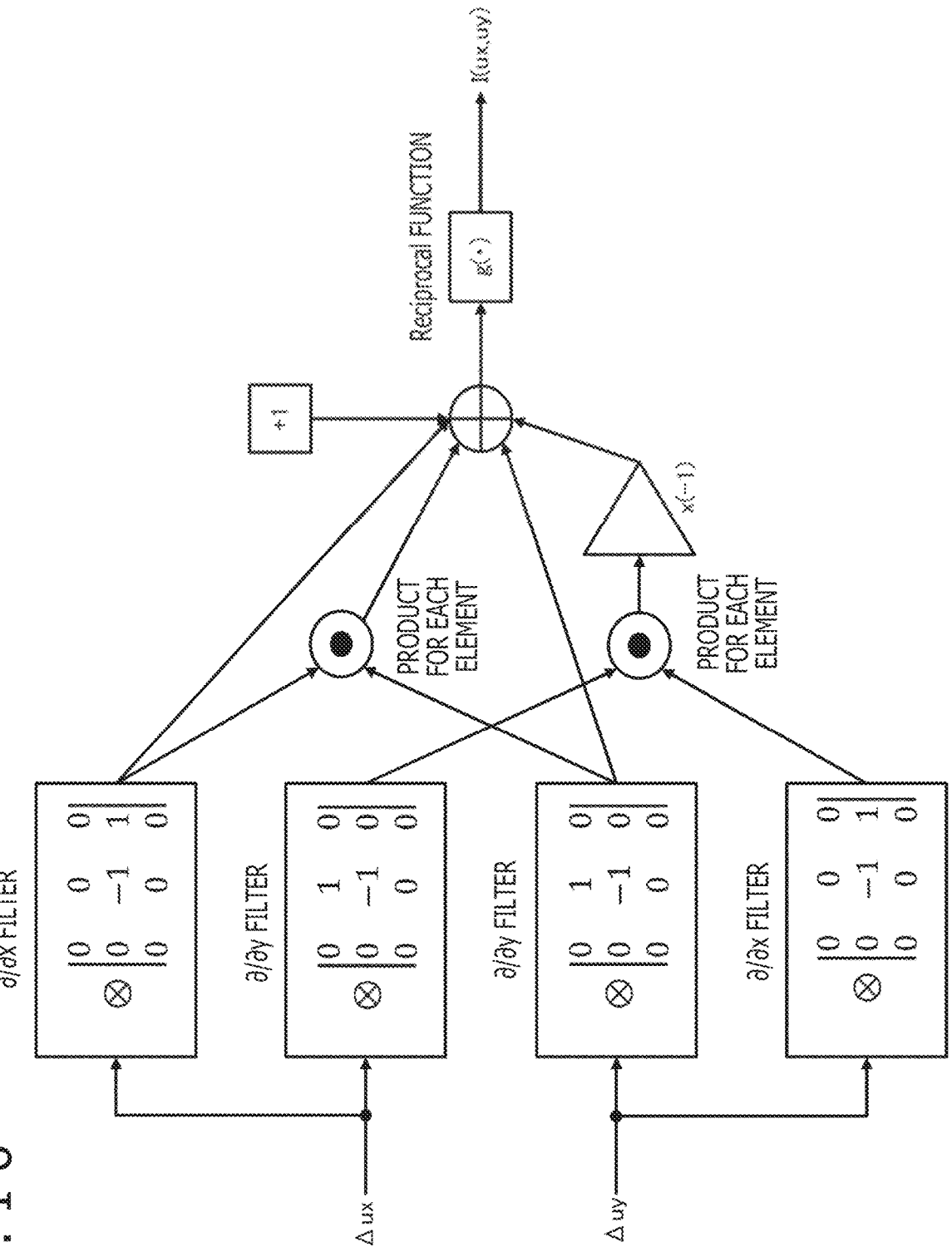
FIG. 16 is a diagram depicting a flow in which a ray optics model is used to calculated an intensity distribution I(ux, uy) from a grid layout $\Delta u(\Delta ux, \Delta uy)$.
Figure 17:
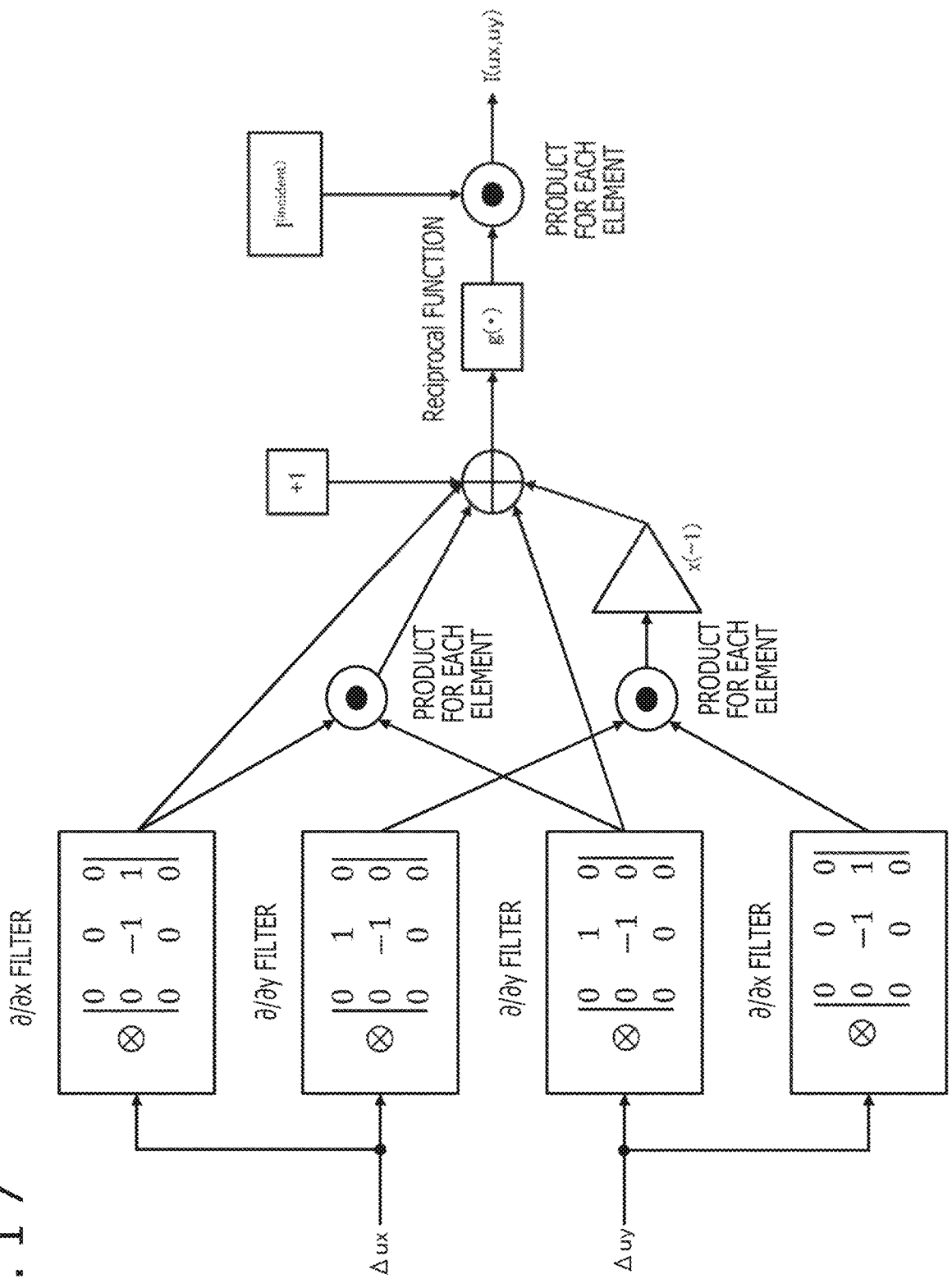
FIG. 17 is a diagram depicting a flow in which the ray optics model is used to calculate the intensity distribution I(ux, uy) from the grid layout $\Delta u(\Delta ux, \Delta uy)$ and an intensity distribution $I^{(incident)}$ of incident light on a phase modulation panel.

FIG. 16 depicts a flow in which Equation (6) above related to the ray optics model is used to calculate the intensity distribution I(ux, uy) from the grid layout Δu(Δux, Δuy). Further, FIG. 17 depicts a flow in which Equation (8) above related to the ray optics model is used to calculate the intensity distribution I(ux, uy) from the grid layout Δu(Δux, Δuy) and the intensity distribution $I^{(incident)}$ of incident light on the phase modulation panel. When the predicted value for the grid layout $\Delta u^{(predict)}(\Delta ux^{(predict)}, \Delta uy^{(predict)})$input to the calculation flow indicated in FIG. 16 or FIG. 17, the reconstructed intensity distribution $I^{reconstruct}$(ux, uy) is output.

Figure 18:
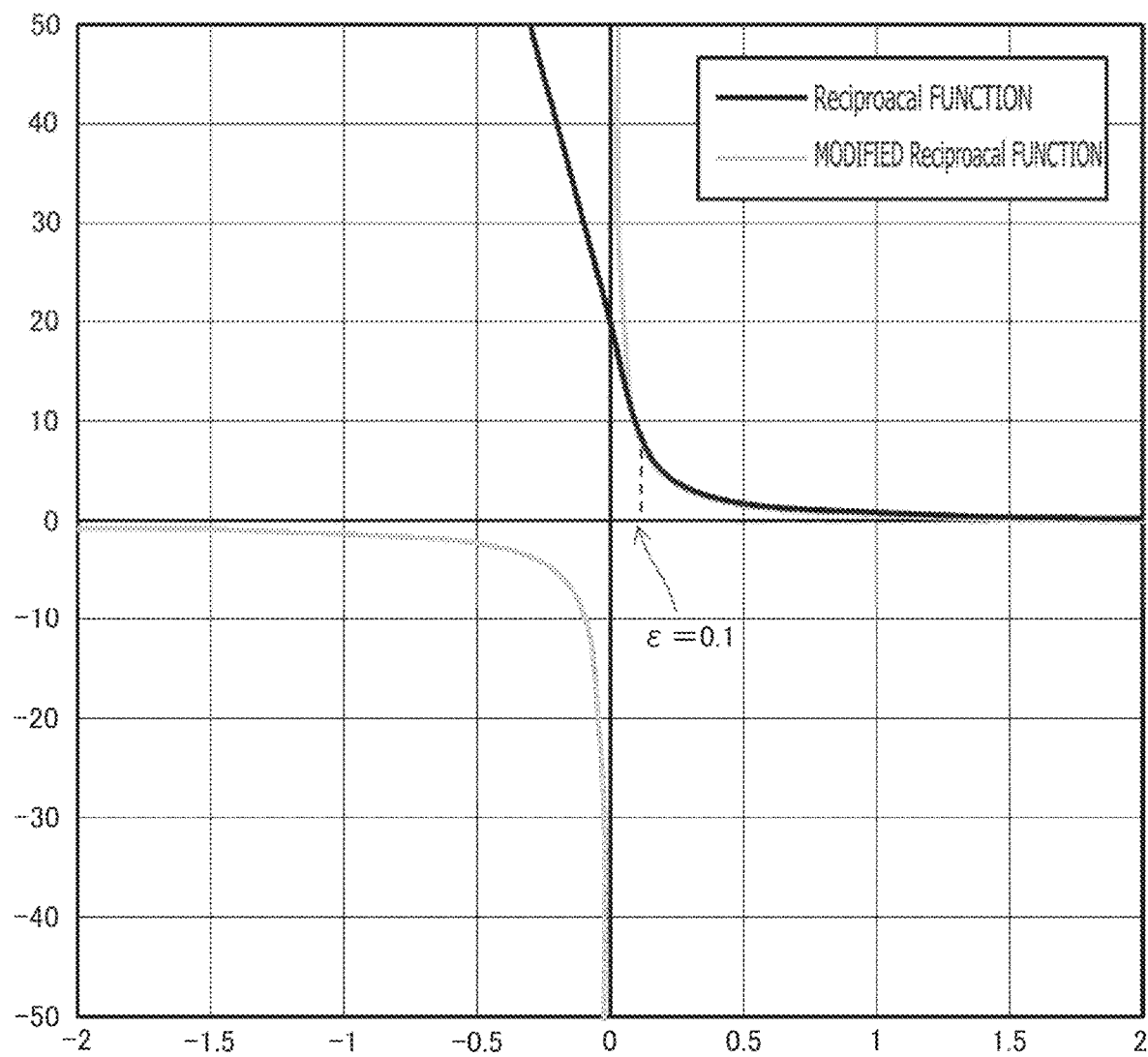
FIG. 18 is a diagram depicting how a Reciprocal function is modified.

Differential operations ∂/∂x and ∂/∂y in FIGS. 16 and 17 can be implemented as convolution operations using filters in the respective figures. Further, g(•) in FIGS. 16 and 17 represents a Reciprocal function g(z)=1/z. Reciprocal means a reciprocal number. The Reciprocal function g(z) is discontinuous when z=0. Thus, as depicted in FIG. 18, the Reciprocal function modified as indicated in Equation (14) below is desirably used such that the differential coefficient is constant when z≤ε (on the assumption that c is a positive constant).

[Math. 12]

$$g(z) = \frac{1}{\varepsilon + ReLU(z - \varepsilon)} + \frac{1}{\varepsilon^2} ReLU(-z + \varepsilon) \quad (14)$$

In Equation (14) above, the positive constant c is desirably set to a range from 0.01 to 0.1. Further, a ReLU function in Equation (14) above is defined by Equation (15) below.

[Math. 13]

$$ReLU(z) = \begin{cases} z, & z \geq 0 \\ 0, & z < 0 \end{cases} \quad (15)$$

In a framework of learning as depicted in FIG. 15, the neural network 901 is trained in such a manner as to output a grid layout having a grid density distribution approximate to the density distribution in the input data. However, a freeform P(x, y) that corresponds to a scalar field providing, as a gradient field, the grid layout $\Delta u^{(predict)}(\Delta ux^{(predict)}, \Delta uy^{(predict)})$ output from the neural network 901 is not necessarily present. The reason is as follows: as an identity in vector analysis, it is known that for any scalar field φ, the rotation of the gradient is always zero (that is, ∇×(∇φ=0), but the framework of the learning depicted in FIG. 15 does not incorporate a mechanism for establishing the identity.

A condition for the presence of the freeform P(x, y) corresponding to a scalar field is that a rotation field (rotation) of the grid layout $\Delta u^{(predict)}(\Delta ux^{(predict)}, \Delta uy^{(Predict)})$ corresponding to the gradient field of the freeform P(x, y) is zero everywhere. The rotation field of the grid layout $\Delta u^{(predict)}(\Delta ux^{(predict)}, \Delta uy^{(predict)})$ is as indicated in Equation (16) below.

[Math. 14]

$$rot\begin{pmatrix} \Delta ux^{(predict)} \\ \Delta uy^{(predict)} \end{pmatrix} = \frac{\partial}{\partial x} \Delta uy^{(predict)} - \frac{\partial}{\partial y} \Delta ux^{(predict)} \quad (16)$$

Consequently, the neural network 901 needs to be trained in such a manner as to output the rotation of gradient of the scalar field being zero, that is, the grid layout $\Delta u^{(predict)}$ $(\Delta ux^{(predict)}, \Delta uy^{(predict)})$ in which the rotation field indicated in Equation (16) above is zero or so close to zero.

A regularization item representing the average of magnitudes of components of the rotation field of the grid layout is introduced into the loss function, in addition to the indicator (described above) for the error between the reconstructed intensity distribution $I^{reconstruct}$(ux, uy) and the input intensity distribution I(ux, uy) obtained by resampling on the grid points u(ux, uy). This enables a reduction in distortion of a reproduced image resulting from post-reconstruction processing (see FIG. 9) performed when a freeform is reproduced. The regularization term related to the rotation field of the grid layout may be, for example, the mean square error defined by Equation (17) below, the mean absolute error defined by Equation (18) below, or the like.

[Math. 15]

$$L^{rot}_{MSE} = \frac{1}{N} \sum_n \sum_k \left\{ \left| \frac{\partial}{\partial x} \Delta uy_{n,k}^{(predict)} - \frac{\partial}{\partial y} \Delta ux_{n,k}^{(predict)} \right|^2 \right\} \quad (17)$$

[Math. 16]

$$L^{rot}_{MAE} = \frac{1}{N} \sum_n \sum_k \left\{ \left| \frac{\partial}{\partial x} \Delta uy_{n,k}^{(predict)} - \frac{\partial}{\partial y} \Delta ux_{n,k}^{(predict)} \right| \right\} \quad (18)$$

Now, description will be given of a method for training the neural network in an unsupervised manner in which output from the ray optics model used as a guide includes the reciprocal of an intensity distribution.

Figure 19:
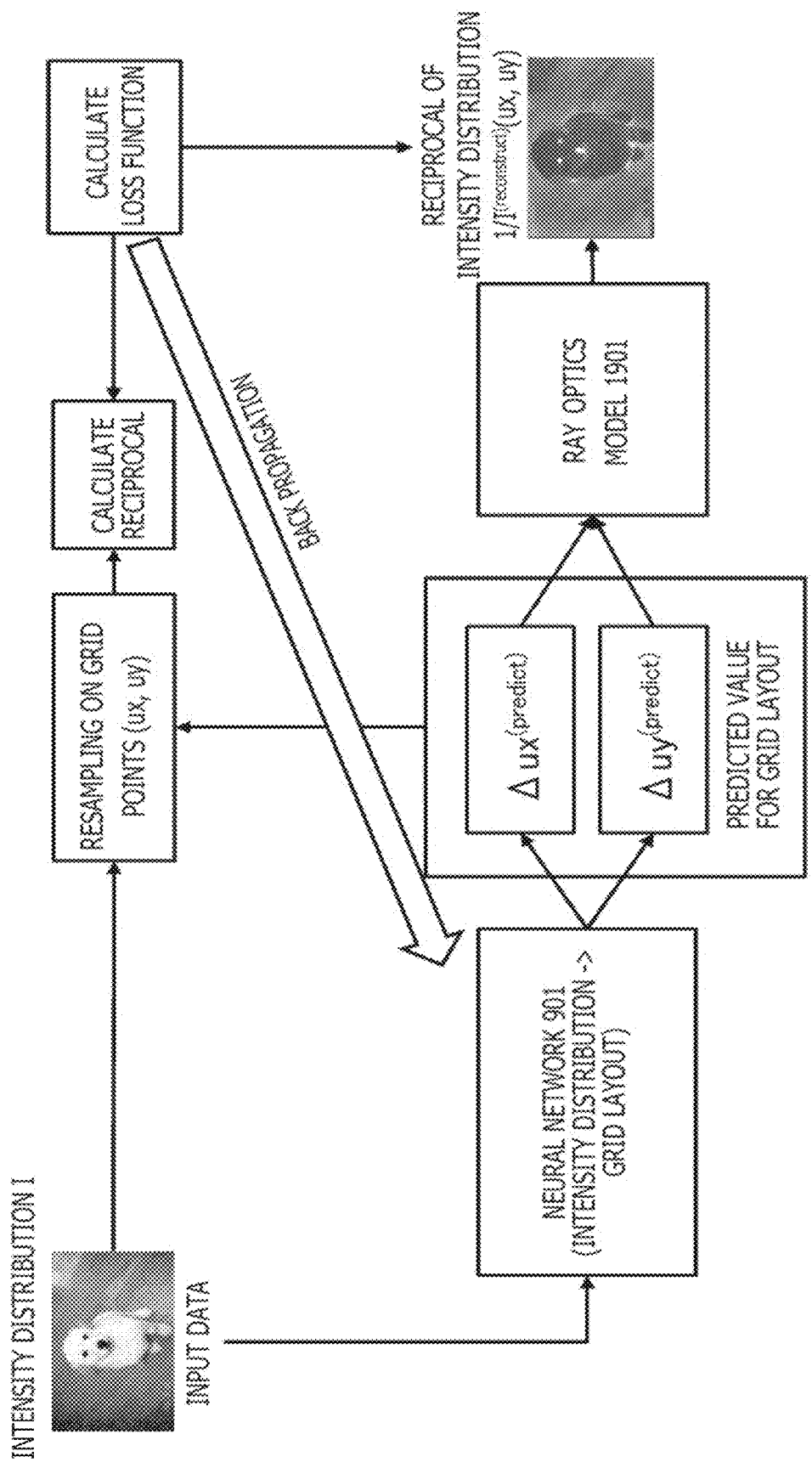
FIG. 19 is a diagram depicting a mechanism of unsupervised learning of the neural network 901 that estimates a grid layout of light rays from an intensity distribution.

FIG. 19 depicts a mechanism of unsupervised learning of the neural network 901 (see FIG. 10) that estimates a grid layout of light rays from an intensity distribution (case in which output from the ray optics model includes the reciprocal of the intensity distribution).

When the intensity distribution I(x, y) corresponding to the input data of learning data is input to the neural network 901, the predicted value for the grid layout $\Delta u^{(predict)}$ $(\Delta ux^{(predict)}, \Delta uy^{(predict)})$ is output from the neural network 901. Then, a ray optics model 1901 indicated in Equation (6) or (8) above is used as a guide to reconstruct the reciprocal of the intensity distribution $I^{reconstruct}$ (ux, uy) from the predicted value for the grid layout $\Delta u^{(predict)}(\Delta ux^{(predict)}, \Delta uy(predict))$.

As is the case with the learning depicted in FIG. 15, the intensity distribution I(ux, uy) that is obtained by resampling, on the grid points u(ux, uy), the intensity distribution I(x, y) corresponding to input data is determined. Then, the reciprocal of the intensity distribution I(ux, uy) of the resampled input data is calculated, and the loss function that is based on the error between this reciprocal and the reciprocal of the intensity distribution $I^{reconstruct}$(ux, uy) reconstructed from the predicted value for the grid layout $\Delta u^{(predict)}(\Delta ux^{(predict)}, \Delta uy^{(predict)})$ output from the neural network 901 is calculated. The neural network 901 is trained by back propagation in such a manner as to minimize the loss function.

The loss function used may serve as an indicator for the error between the reconstructed intensity distribution $I^{reconstruct}$(ux, uy) and the input intensity distribution I(ux, uy) obtained by resampling on the grid points u(ux, uy). Further, as is the case with the learning depicted in FIG. 15, the regularization term (see Equations (17) and (18) above) related to the rotation field of the grid layout is desirably added to the loss function.

Figure 20:
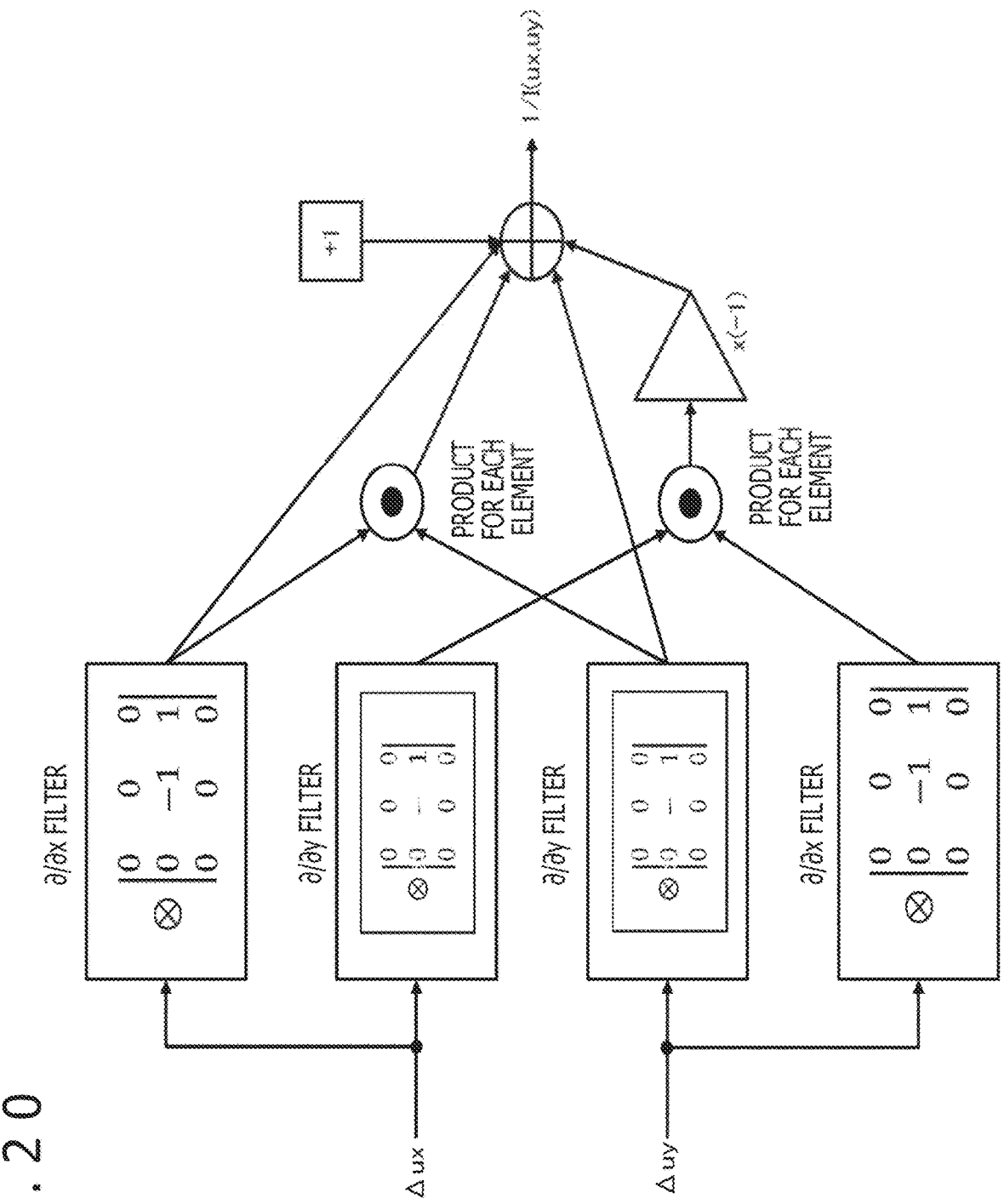
FIG. 20 is a diagram depicting a flow in which the ray optics model is used to calculate the reciprocal of the intensity distribution I(ux, uy) from the grid layout $\Delta u(\Delta ux, \Delta uy)$.
Figure 21:
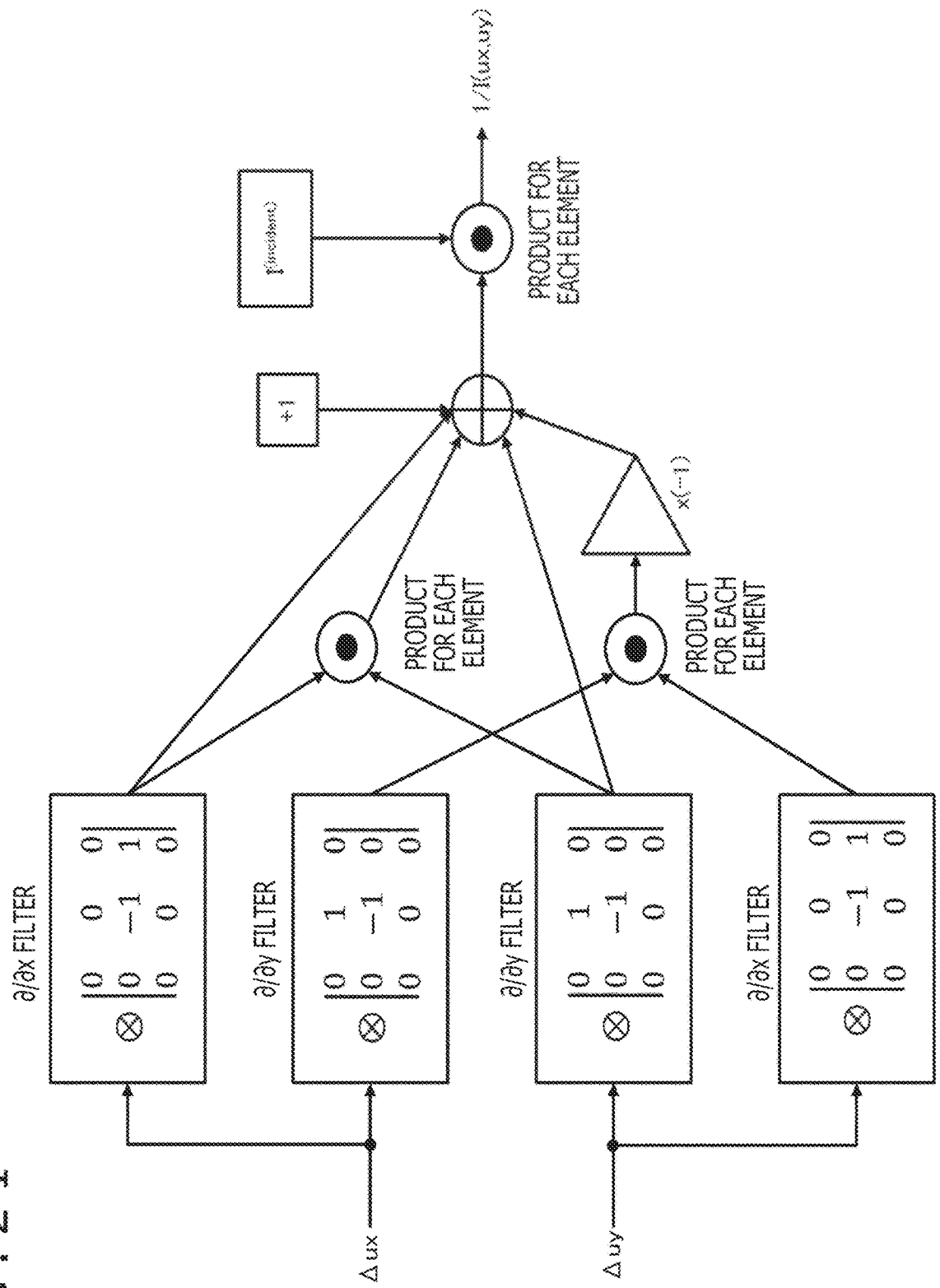
FIG. 21 is a diagram depicting a flow in which the ray optics model is used to calculate the reciprocal of the intensity distribution I (ux, uy) from the grid layout $\Delta u(\Delta ux, \Delta uy)$ and the intensity distribution $I^{(incident)}$ of incident light on a phase modulation panel.

FIG. 20 depicts a flow in which Equation (6) above related to the ray optics model is used to calculate the reciprocal of the intensity distribution I(ux, uy) from the grid layout Δu(Δux, Δuy). Further, FIG. 21 depicts a flow in which Equation (8) above related to the ray optics model is used to calculate the intensity distribution I(ux, uy) from the grid layout Δu(Δux, Δuy) and the intensity distribution $I^{(incident)}$ of incident light on the phase modulation panel. When the predicted value for the grid layout $\Delta u^{(predict)}$ ($\Delta ux^{(predict)}$, $\Delta uy^{(predict)}$) is input to the calculation flow depicted in FIG. 20 or FIG. 21, the reciprocal of the reconstructed intensity distribution $I^{reconstruct}$(ux, uy) is output.

H-2-2. Unsupervised Learning of Neural Network that Estimates Freeform from Intensity Distribution Possible is a method in which output from the ray optics model used as a guide includes an intensity distribution, and also a method in which output from the ray optics model used as a guide includes the reciprocal of the intensity distribution. First, description will be given of a method for training the neural network in an unsupervised manner in which output from the ray optics model used as a guide includes an intensity distribution.

Figure 22:
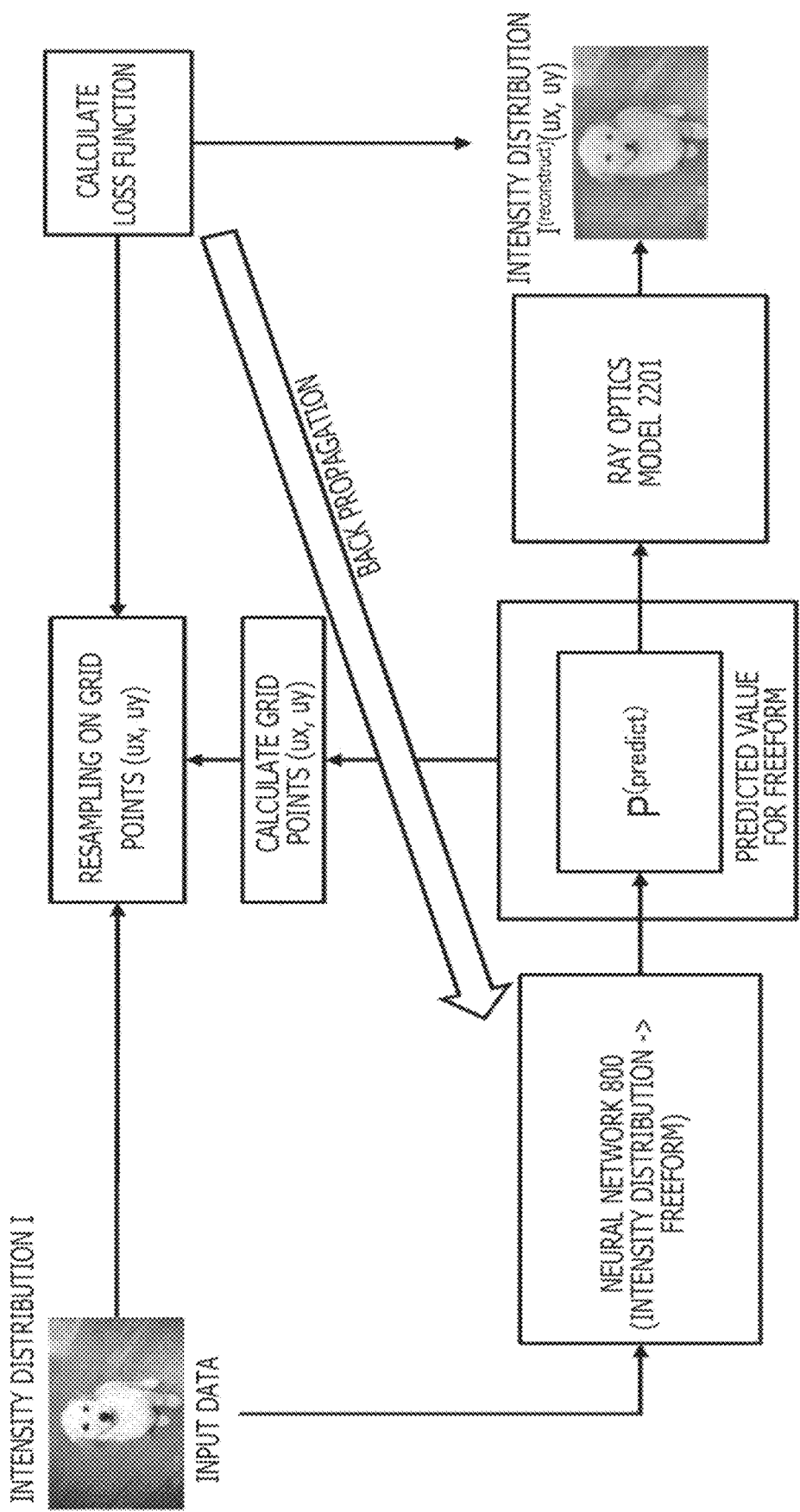
FIG. 22 is a diagram depicting a mechanism of unsupervised learning of the neural network 800 that estimates a freeform from an intensity distribution.

FIG. 22 depicts a mechanism of unsupervised learning of the neural network 800 (see FIG. 8) that estimates a freeform from an intensity distribution (case in which output from the ray optics model includes an intensity distribution).

When the intensity distribution I(x, y) corresponding to the input data of learning data is input to the neural network 800, a predicted value $P^{(predict)}$(x, y) for the freeform is output from the neural network 800. Then, a ray optics model 2201 indicated in Equation (5) or (7) above is used as a guide to reconstruct the intensity distribution $I^{reconstruct}$ (ux, uy) from the freeform $P^{(predict)}$(x, y) predicted by the neural network 800.

Further, Equation (1) above is used to calculate, from the freeform $P^{(predict)}$(X, y) predicted by the neural network 800, the grid points u(ux, uy) formed by a group of light rays being incident on the phase modulation panel 101 and then being refracted by the freeform and passing through the image surface of the luminance modulation panel 102.

As is the case with the learning depicted in FIG. 15, the intensity distribution I(ux, uy) that is obtained by resampling, on the grid points u(ux, uy), the intensity distribution I(x, y) corresponding to input data is determined. Then, the loss function that is based on the error between the intensity distribution I(ux, uy) of the resampled input data and the intensity distribution $I^{reconstruct}$(ux, uy) reconstructed from the predicted value for the freeform $p^{(predict)}$(x,y) output from the neural network 800 is calculated. The neural network 800 is trained by back propagation in such a manner as to minimize the loss function. The loss function used may serve as an indicator for the error between the reconstructed intensity distribution $I^{reconstruct}$(ux, uy) and the input intensity distribution I(ux, uy) obtained by resampling on the grid points u(ux, uy).

Note that the neural network 800 predicts the freeform P(x, y) corresponding to a scalar field and thus the problem of absence of a scalar field providing the grid layout as a gradient field is prevented. Consequently, the regularization term related to the rotation field of the grid layout (see Equations (17) and (18) above) need not be added to the loss function.

Now, description will be given of a method for training the neural network in an unsupervised manner in which output from the ray optics model used as a guide includes the reciprocal of an intensity distribution.

Figure 23:
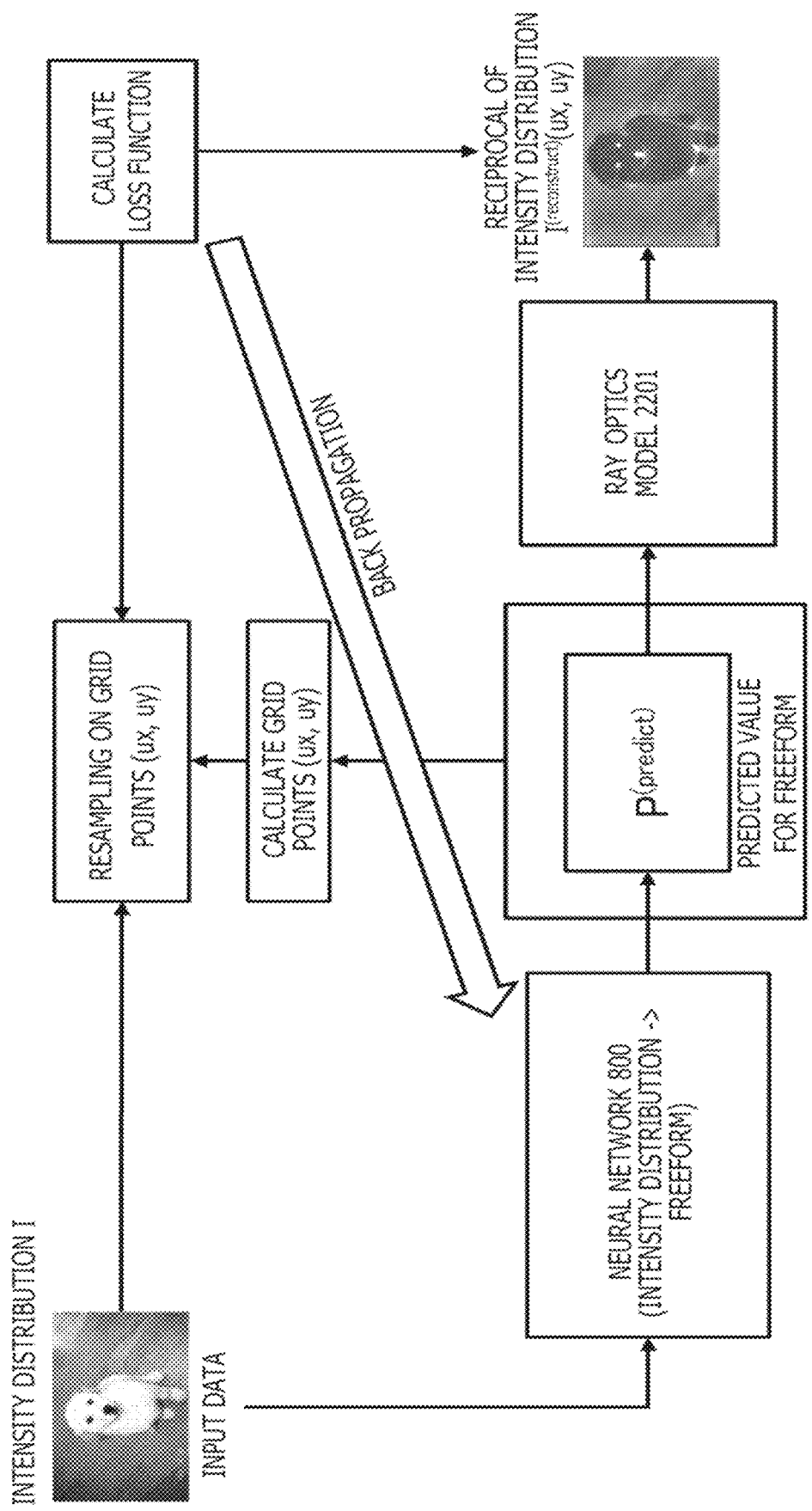
FIG. 23 is a diagram depicting a mechanism of unsupervised learning of the neural network 800 that estimates a freeform from an intensity distribution.

FIG. 23 depicts a mechanism of unsupervised learning of the neural network 800 that estimates a freeform from an intensity distribution (case in which output from the ray optics model includes the reciprocal of the intensity distribution).

When the intensity distribution I(x, y) corresponding to the input data of learning data is input to the neural network 800, the predicted value for the freeform $P^{(predict)}$(x, y) is output from the neural network 800. Then, a ray optics model 2301 indicated in Equation (5) or (7) above is used as a guide to reconstruct the reciprocal of the intensity distribution $I^{reconstruct}$ (ux, uy) from the freeform $P^{(predict)}$(x, y) predicted by the neural network 800.

Further, Equation (1) above is used to calculate, from the freeform $P^{(predict)}$(x, y) predicted by the neural network 800, the grid points u(ux, uy) formed by a group of light rays being incident on the phase modulation panel 101 and then being refracted by the freeform and passing through the image surface of the luminance modulation panel 102.

As is the case with the learning depicted in FIG. 15, the intensity distribution I(ux, uy) that is obtained by resampling, on the grid points u(ux, uy), the intensity distribution I(x, y) corresponding to input data is determined. Then, the reciprocal of the intensity distribution I(ux, uy) of the resampled input data is calculated, and the loss function that is based on the error between this reciprocal and the reciprocal of the intensity distribution $I^{reconstruct}$(ux, uy) reconstructed from the predicted value for the freeform $P^{(predict)}$(x, y) output from the neural network 800 is calculated. The neural network 800 is trained by back propagation in such a manner as to minimize the loss function. The loss function used may serve as an indicator for the error between the reciprocal of the reconstructed intensity distribution $I^{reconstruct}$(ux, uy) and the reciprocal of the input intensity distribution I(ux, uy) obtained by resampling on the grid points u(ux, uy).

Note that the neural network 800 predicts the freeform P(x, y) corresponding to a scalar field and thus the regularization term related to the rotation field of the grid layout (see Equations (17) and (18) above) need not be added to the loss function.

I. Other Applied Examples

Examples in which the freeform estimation technique using the trained neural network model according to the present disclosure is applied to the HDR-compatible projector have mainly been described. The present disclosure is applicable to illumination apparatuses in general which dynamically change the intensity distribution.

Figure 24:
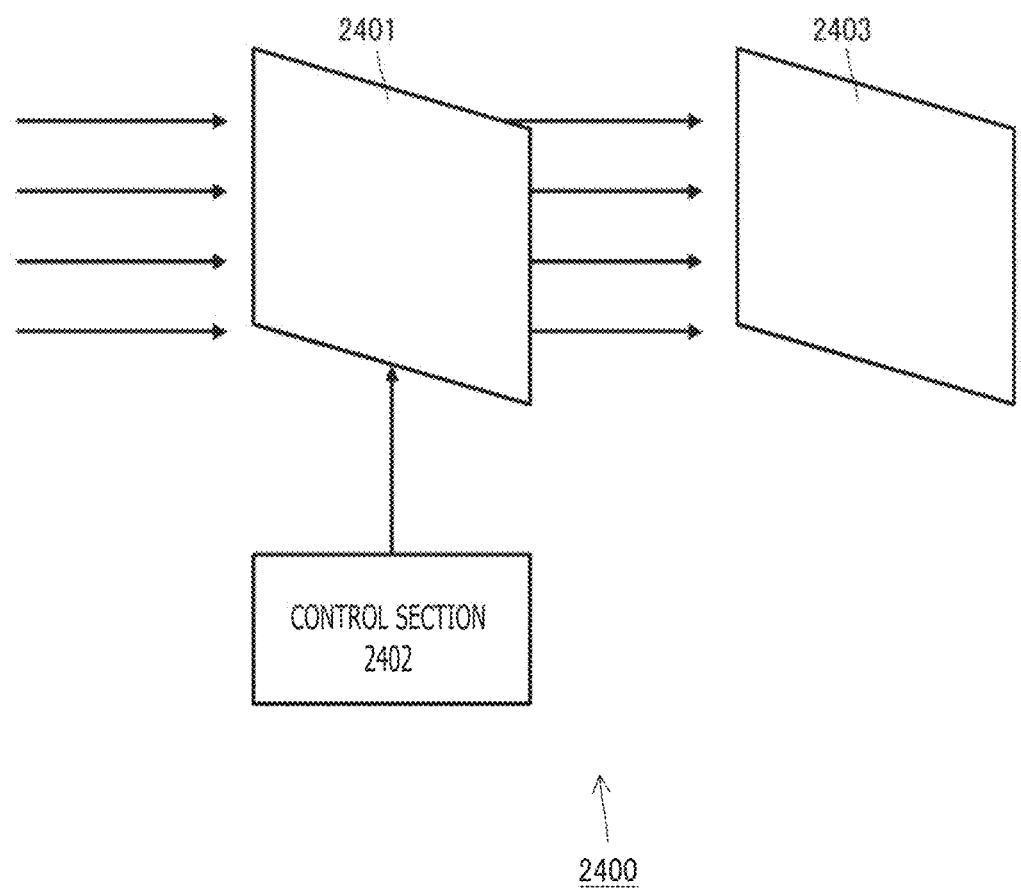
FIG. 24 is a diagram depicting a configuration example of an illumination apparatus 2400.

FIG. 24 schematically depicts a configuration example of the illumination apparatus 2400 to which the present disclosure is applied. The illumination apparatus 2400 includes a light source (not depicted) that radiates uniform light, a phase modulation panel 2401 that applies phase modulation to uniform light from the light source to emit the light onto an image surface 2403, and a control section 2402. A phase modulation distribution to be displayed on the phase modulation panel 2401 is to be controlled by the control section 2402.

The image surface 2403 corresponds to the incident surface 102b of the luminance modulation panel 102 in the projector 100 depicted in FIG. 1. In the case of the illumination apparatus 2400 depicted in FIG. 24, emitted light from the phase modulation panel 2401 is directly used as illumination light, and thus the image surface 2403 corresponds to a projection surface itself. Note that, in FIG. 24, the illumination apparatus 2400 is drawn in a simplified manner for convenience of description and that calculating the phase modulation distribution and multiplying the phase modulation distribution by a constant before displaying the phase modulation distribution on the phase modulation panel 2401 allow the distance between the phase modulation panel 2401 and the image surface 2403 to be made variable.

The control section 2402 controls driving of the phase modulation panel 2401 in reference to a target image emitted by the illumination apparatus 2400. Specifically, the control section 2402 controls formation of the phase modulation distribution on the phase modulation panel 2401 in accordance with the following procedure.

(Step 1) Setting of Target Image

A target image that is to be displayed on the image surface 2403 (in other words, to be illuminated) is set.

(Step 2) Setting of Target Intensity Distribution in Phase Modulation

A target intensity distribution, on the image surface 2403, of emitted light from the phase modulation panel 2401 is set.

(Step 3) Calculation of Phase Modulation Distribution

A phase modulation distribution to be displayed on the phase modulation panel 3401 is calculated, the phase modulation distribution causing emitted light from the phase modulation panel 2401 to form the target intensity distribution determined in step 2 described above. In the present disclosure, the trained neural network model is used to calculate the phase modulation distribution corresponding to the target intensity distribution. The trained neural network model directly estimates a freeform phase modulation distribution causing the density distribution of light rays emitted from the phase modulation panel 2401 to approximate the target intensity distribution. The details of the trained neural network model are as described above (see items C, D, and F to H described above).

Figure 25:
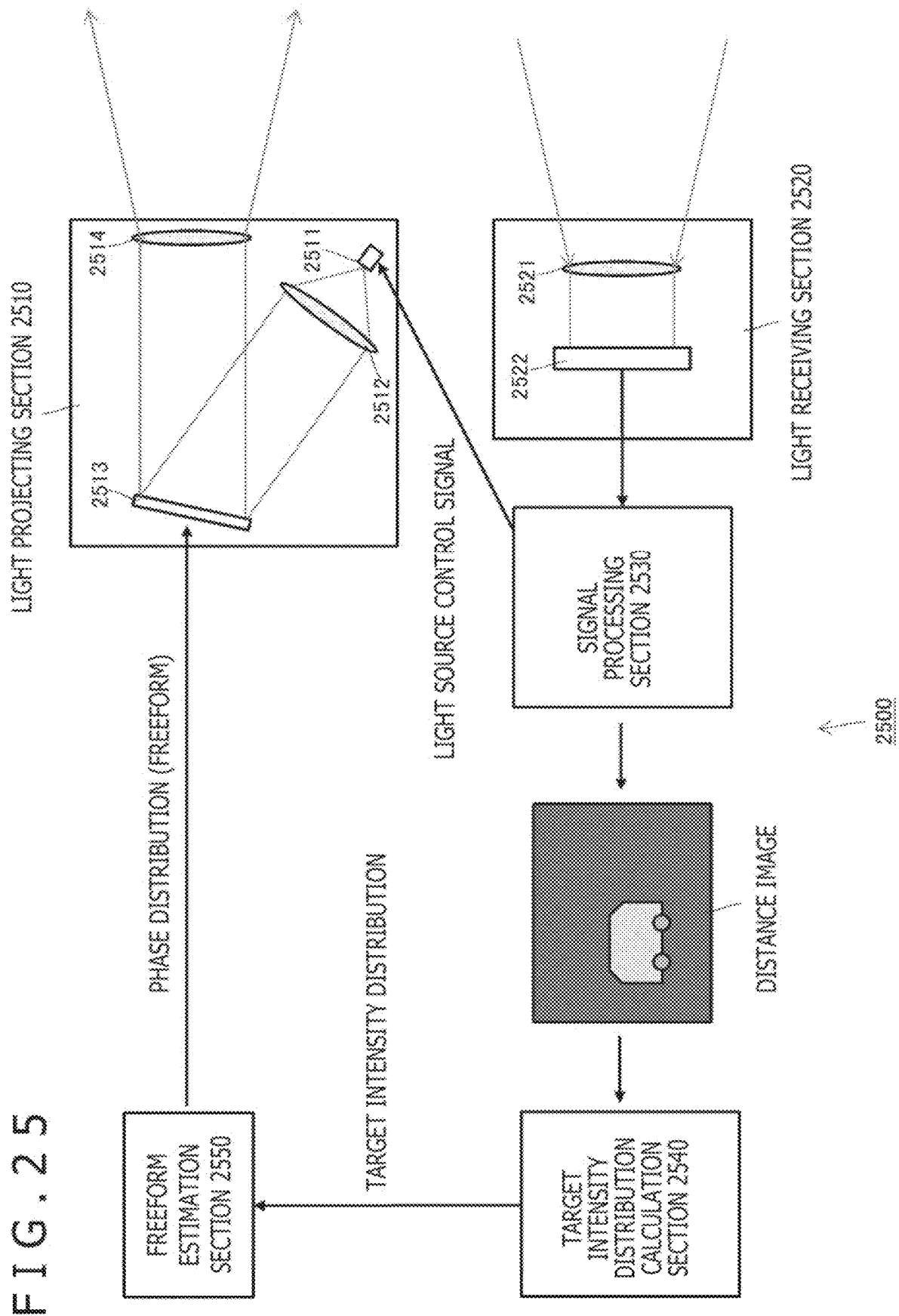
FIG. 25 is a diagram depicting a configuration example of a ToF sensor 2500.

FIG. 25 depicts a configuration example of a TOF (Time Of Flight) sensor 2500 to which the illumination apparatus according to the present disclosure is applied. The ToF sensor is a distance sensor based on distance measurement which measures the time required for projected light to return to the original position after being reflected by an object, the time being converted into the distance to the object. The ToF sensor 2500 depicted includes a light projecting section 2510, a light receiving section 2520, a signal processing section 2530, a target intensity distribution calculation section 2540, and a freeform estimation section 2550.

The light projecting section 2510, the light receiving section 2520, and the signal processing section 2530 are basic components for performing measuring distance in the ToF sensor 2500. Light is emitted from the light projecting section 2510, and reflected light from the object is received by the light receiving section 2520. The signal processing section 2530 executes signal processing on a light reception signal to generate a distance image (Depth Map).

The light projecting section 2510 includes a light source 2511, a collimate lens 2512, a phase modulation panel 2513, and an enlarged projection lens 2514. The light source 2511 blinks according to a light source control signal from the signal processing section 2530 to output light (pulsed light). The collimate lens 2512 collimates light rays from the light source 2511 and focuses the resultant parallel rays on the phase modulation panel 2513. The phase modulation panel 2513 is of a reflective type, and in reference to a freeform (phase distribution) provided by the freeform estimation section 2550 described below, reflects the parallel rays from the collimate lens 2512 to emit reflected light with a target intensity distribution. Then, the enlarged projection lens 2514 enlarges and projects the reflected light from the phase modulation panel 2513 and emits the enlarged reflected light.

The light receiving section 2520 includes an image formation lens 2521 and a light receiving sensor 2522. The image formation lens 2521 focuses reflected light corresponding to light emitted from the light projecting section 2510, to form the reflected light into an image on a light receiving surface of the light receiving sensor 2522. The light receiving sensor 2522 includes sensor elements that are arranged in an array and that each generate, for example, an electric signal corresponding to the intensity of light, and outputs a light reception signal including the electric signals of the sensor elements.

The signal processing section 2530 outputs the light source control signal to the light source 2511 to cause the light projecting section 251 to emit light, and executes signal processing on the light reception signal from the light receiving sensor 2522 to convert the time between light projection and light reception into a distance, generating a distance image (Depth Map). Operations of the light projecting section 2510, the light receiving section 2520, and the signal processing section 2530 as described above correspond to operations of a typical ToF sensor.

In reference to the distance image, the target intensity distribution calculation section 2540 calculates a target intensity distribution to be formed on an incident surface of the enlarged projection lens 2514 by the phase modulation panel 2513 or a target intensity distribution to be formed in an enlarged projected image on the enlarged projection lens 2514 by the phase modulation panel 2513. The target intensity distribution calculation section 2540 detects, for example, regions in the distance image which have a reduced SN ratio of distance data due to an insufficient intensity of reflected light, and calculates the target intensity distribution in such a manner to obtain a sufficient reflected light intensity.

The freeform estimation section 2550 estimates a phase modulation distribution to be displayed on the phase modulation panel 2513 such that emitted light from the phase modulation panel 2513 forms the target intensity distribution calculated by the target intensity distribution calculation section 2540. In other words, the freeform estimation section 2550 estimates a freeform. In the present disclosure, the freeform estimation section 2550 uses the trained neural network model to estimate the freeform. The trained neural network model is mainly characterized by direct estimation of a freeform phase modulation distribution causing the density distribution of light rays emitted from the phase modulation panel 2513 to approximate the target intensity distribution. The details of this point are as already described above in items C, D, and F to H.

INDUSTRIAL APPLICABILITY

With reference to the specific embodiments, the present disclosure has been described in detail. However, obviously, a person skilled in the art may achieve modifications or substitutions of the embodiments without departing from the spirit and scope of the present disclosure.

In the present specification, the embodiments in which the present disclosure is applied to the HDR-compatible projector or the image display apparatus for the projector have mainly been described. However, the spirit and scope of the present disclosure are not limited to the HDR-compatible projector or the image display apparatus. The present disclosure can be applied to various technologies for performing wavefront control on incident light with use of a spatial light modulator. For example, applying the present disclosure to various illumination apparatuses including a light emitting section of the ToF sensor makes it possible to dynamically change the intensity distribution.

In short, the present disclosure has been described in the form of illustration, and the details of the present specification should not be interpreted in a limited manner. Claims should be taken into account in order to determine the spirit and scope of the present disclosure.

The present disclosure can also be configured as described below.

(1) An illumination apparatus including:
a trained neural network model that estimates a phase modulation distribution corresponding to a target intensity distribution; and
a phase modulation section that performs phase modulation on incident light in reference to the phase modulation distribution estimated by the trained neural network model.

(2) The illumination apparatus according to (1) described above, in which
the trained neural network model directly estimates a phase modulation distribution that realizes a ray density distribution corresponding to the target intensity distribution.

(3) The illumination apparatus according to (1) or (2) described above, further including:
a luminance modulation section that performs luminance modulation on emitted light from the phase modulation section, in which
the target intensity distribution includes a target intensity distribution calculated in reference to a target image to be displayed by emitted light from the luminance modulation section, and
the luminance modulation section performs luminance modulation with use of a luminance modulation distribution calculated in reference to the target image and the phase modulation distribution.

(4) The illumination apparatus according to (1) or (2) described above, further including:
a light receiving section that receives emitted light from the phase modulation section, in which
the target intensity distribution is set in reference to a processing result for a light reception signal from the light receiving section.

(5) The illumination apparatus according to (2) described above, in which
the trained neural network model is trained in reference to learning data including a set of an intensity distribution input to a neural network model and a phase modulation distribution used as training data.

(6) The illumination apparatus according to (2) described above, in which
the neural network model is trained in an unsupervised manner in reference to an error between an intensity distribution input to the neural network model and an intensity distribution calculated in reference to propagation calculation from the phase modulation distribution estimated by the neural network model.

(7) The illumination apparatus according to (2) described above, in which
the neural network model is trained in an unsupervised manner in reference to an error between a reciprocal of an intensity distribution input to the neural network model and a reciprocal of an intensity distribution calculated in reference to propagation calculation from the phase modulation distribution estimated by the neural network model.

(8) The illumination apparatus according to (1) described above, in which
the trained neural network model estimates a layout of light rays corresponding to the target intensity distribution, and
the illumination apparatus further includes a calculation section that calculates a phase modulation distribution in reference to the layout of the light rays.

(9) The illumination apparatus according to (8) described above, in which
the calculation section calculates the phase modulation distribution from the layout of the light rays with use of an algorithm for reconstructing a curved surface from a gradient field.

(10) The illumination apparatus according to (8) described above, in which
the trained neural network model is trained in reference to learning data including a set of an intensity distribution input to the neural network model and the layout of the light rays used as training data.

(11) The illumination apparatus according to (8) described above, in which
the trained neural network model is trained in an unsupervised manner in reference to an error between an intensity distribution input to the neural network model and an intensity distribution calculated in reference to a ray optics model from the layout of the light rays estimated by the neural network model.

(12) The illumination apparatus according to (8) described above, in which
the trained neural network model is trained in an unsupervised manner in reference to an error between a reciprocal of an intensity distribution input to the neural network model and a reciprocal of an intensity distribution calculated in reference to a ray optics model from the layout of the light rays estimated by the neural network model.

(13) A method for generating a trained neural network model that estimates a phase modulation distribution corresponding to a target intensity distribution, the method including:
an input step of inputting an intensity distribution to a neural network model;
an evaluation step of evaluating a phase modulation distribution estimated from the intensity distribution by the neural network model; and
a learning step of training the neural network model in reference to a result of the evaluation.

(14) The method for generating a trained neural network model according to (13) described above, in which
the evaluation step includes calculating a loss function based on an error between the phase modulation distribution estimated from the intensity distribution by the neural network model and a phase modulation distribution used as training data corresponding to the intensity distribution, and the learning step includes training the neural network model with use of the loss function.

(15) The method for generating a trained neural network model according to (13) described above, in which the evaluation step includes calculating an error between the intensity distribution input to the neural network model and an intensity distribution calculated in reference to propagation calculation from the phase modulation distribution estimated from the intensity distribution by the neural network model, and the learning step includes training the neural network model in an unsupervised manner with use of the loss function based on the error.

(16) The method for generating a trained neural network model according to (13) described above, in which the evaluation step includes calculating a loss function based on an error between a reciprocal of the intensity distribution input to the neural network model and a reciprocal of an intensity distribution calculated in reference to propagation calculation from the phase modulation distribution estimated from the intensity distribution by the neural network model, and the learning step includes training the neural network model in an unsupervised manner with use of the loss function.

(17) A method for generating a trained neural network model that estimates a layout of light rays corresponding to a target intensity distribution, the method including:

an input step of inputting an intensity distribution to a neural network model;

an evaluation step of evaluating the layout of the light rays estimated from the intensity distribution by the neural network model; and a learning step of training the neural network model in reference to a result of the evaluation.

(18) The method for generating a trained neural network model according to (17) described above, in which the evaluation step includes calculating a loss function based on an error between the layout of the light rays estimated from the intensity distribution by the neural network model and a layout of light rays used as training data corresponding to the intensity distribution, and the learning step includes training the neural network model with use of the loss function.

(19) The method for generating a trained neural network model according to (18) described above, further including:

a collection step of collecting learning data by acquiring a layout of light rays used as training data by gradient field calculation from a phase modulation distribution calculated using a calculation algorithm for any phase modulation distribution with a certain intensity distribution set as a target intensity distribution and further resampling, on equally spaced grid points, an intensity distribution calculated from the layout of the light rays in reference to a ray optics model, in which the input step includes inputting the learning data to the neural network model, and the evaluation step includes evaluating the layout of the light rays estimated by the neural network model from the learning data input, by comparing the layout of the light rays with the layout of the light rays used as the training data.

(20) The method for generating a trained neural network model according to (17) described above, in which the evaluation step includes calculating a loss function based on an error between the intensity distribution input to the neural network model and an intensity distribution calculated in reference to a ray optics model from the layout of the light rays estimated from the intensity distribution by the neural network model, and the learning step includes training the neural network model with use of the loss function.

(21) The method for generating a trained neural network model according to (17) described above, in which the evaluation step includes calculating a loss function based on an error between a reciprocal of the intensity distribution input to the neural network model and a reciprocal of an intensity distribution calculated in reference to a ray optics model from the layout of the light rays estimated from the intensity distribution by the neural network model, and the learning step includes training the neural network model with use of the loss function.

(22) The method for generating a trained neural network model according to (20) or (21) described above, in which the learning step includes training the neural network model with use of a loss function including a regularization term representing an average of magnitudes of components of a rotation field of the layout of the light rays.

(23) A computer program described in a computer readable format to execute, on a computer, processing for generating a trained neural network model that estimates a phase modulation distribution corresponding to a target intensity distribution, the computer program causing the computer to function as:

an input section that inputs an intensity distribution to a neural network model;

an evaluation section that evaluates the phase modulation distribution estimated from the intensity distribution by the neural network model; and a learning section that trains the neural network model in reference to a result of the evaluation.

(24) A computer program described in a computer readable format to execute, on a computer, processing for generating a trained neural network model that estimates a phase modulation distribution corresponding to a target intensity distribution, the computer program causing the computer to function as:

an input section that inputs an intensity distribution to a neural network model;

an evaluation section that evaluates a layout of light rays estimated from the intensity distribution by the neural network model; and a learning section that trains the neural network model in reference to a result of the evaluation.

REFERENCE SIGNS LIST

100: Projector
101: Phase modulation panel
102: Luminance modulation panel
103: Enlarged optical system
104: Screen
201: Target intensity distribution calculation section
202: Freeform estimation section
203: Luminance modulation distribution calculation section 2400: Illumination apparatus
2401: Phase modulation panel
2402: Control section
2500: ToF sensor
2510: Light projecting section
2511: Light source
2512: Collimate lens
2513: Phase modulation panel
2514: Enlarged projection lens
2520: Light receiving section
2521: Image formation lens
2522: Light receiving sensor
2530: Signal processing section
2540: Target intensity distribution calculation section
2550: Freeform estimation section

What is claimed is:

1. An illumination apparatus, comprising:
a trained neural network model that estimates a phase modulation distribution corresponding to a target intensity distribution;
a phase modulation section that performs phase modulation on incident light in reference to the phase modulation distribution estimated by the trained neural network model; and
a luminance modulation section that performs luminance modulation on emitted light from the phase modulation section,
wherein the target intensity distribution includes a target intensity distribution calculated in reference to a target image to be displayed by emitted light from the luminance modulation section, and
wherein the luminance modulation section performs luminance modulation with use of a luminance modulation distribution calculated in reference to the target image and the phase modulation distribution.

2. An illumination apparatus, comprising:
a trained neural network model that estimates a phase modulation distribution corresponding to a target intensity distribution; and
a phase modulation section that performs phase modulation on incident light in reference to the phase modulation distribution estimated by the trained neural network model,
wherein the trained neural network model directly estimates a phase modulation distribution that realizes a ray density distribution corresponding to the target intensity distribution, and
wherein the neural network model is trained in an unsupervised manner in reference to an error between an intensity distribution input to the neural network model and an intensity distribution calculated in reference to propagation calculation from the phase modulation distribution estimated by the neural network model.

3. An illumination apparatus, comprising:
a trained neural network model that estimates a phase modulation distribution corresponding to a target intensity distribution; and
a phase modulation section that performs phase modulation on incident light in reference to the phase modulation distribution estimated by the trained neural network model,
wherein the trained neural network model directly estimates a phase modulation distribution that realizes a ray density distribution corresponding to the target intensity distribution,
wherein the neural network model is trained in an unsupervised manner in reference to an error between a reciprocal of an intensity distribution input to the neural network model and a reciprocal of an intensity distribution calculated in reference to propagation calculation from the phase modulation distribution estimated by the neural network model.

4. An illumination apparatus, comprising:
a trained neural network model that estimates a phase modulation distribution corresponding to a target intensity distribution;
a phase modulation section that performs phase modulation on incident light in reference to the phase modulation distribution estimated by the trained neural network model; and
a calculation section that calculates a phase modulation distribution in reference to a layout of light rays,
wherein the trained neural network model estimates the layout of light rays corresponding to the target intensity distribution, and
wherein the calculation section calculates the phase modulation distribution from the layout of the light rays with use of an algorithm for reconstructing a curved surface from a gradient field.

5. An illumination apparatus, comprising:
a trained neural network model that estimates a phase modulation distribution corresponding to a target intensity distribution;
a phase modulation section that performs phase modulation on incident light in reference to the phase modulation distribution estimated by the trained neural network model; and
a calculation section that calculates a phase modulation distribution in reference to a layout of light rays,
wherein the trained neural network model estimates the layout of light rays corresponding to the target intensity distribution, and
wherein the trained neural network model is trained in an unsupervised manner in reference to an error between an intensity distribution input to the neural network model and an intensity distribution calculated in reference to a ray optics model from the layout of the light rays estimated by the neural network model.

6. An illumination apparatus, comprising:
a trained neural network model that estimates a phase modulation distribution corresponding to a target intensity distribution;
a phase modulation section that performs phase modulation on incident light in reference to the phase modulation distribution estimated by the trained neural network model; and
a calculation section that calculates a phase modulation distribution in reference to a layout of light rays,
wherein the trained neural network model estimates the layout of light rays corresponding to the target intensity distribution, and,
wherein the trained neural network model is trained in an unsupervised manner in reference to an error between a reciprocal of an intensity distribution input to the neural network model and a reciprocal of an intensity distribution calculated in reference to a ray optics model from the layout of the light rays estimated by the neural network model.

7. A method for generating a trained neural network model that estimates a phase modulation distribution corresponding to a target intensity distribution, the method comprising:

an input step of inputting an intensity distribution to a neural network model;

an evaluation step of evaluating a phase modulation distribution estimated from the intensity distribution by the neural network model; and a learning step of training the neural network model in reference to a result of the evaluation, wherein the evaluation step includes calculating an error between the intensity distribution input to the neural network model and an intensity distribution calculated in reference to propagation calculation from the phase modulation distribution estimated from the intensity distribution by the neural network model, and wherein the learning step includes training the neural network model in an unsupervised manner with use of a loss function based on the error.

8. A method for generating a trained neural network model that estimates a phase modulation distribution corresponding to a target intensity distribution, the method comprising:

an input step of inputting an intensity distribution to a neural network model;

an evaluation step of evaluating a phase modulation distribution estimated from the intensity distribution by the neural network model; and a learning step of training the neural network model in reference to a result of the evaluation, wherein the evaluation step includes calculating a loss function based on an error between a reciprocal of the intensity distribution input to the neural network model and a reciprocal of an intensity distribution calculated in reference to propagation calculation from the phase modulation distribution estimated from the intensity distribution by the neural network model, and wherein the learning step includes training the neural network model in an unsupervised manner with use of the loss function.

9. A method for generating a trained neural network model that estimates a layout of light rays corresponding to a target intensity distribution, the method comprising:

an input step of inputting an intensity distribution to a neural network model;

an evaluation step of evaluating the layout of the light rays estimated from the intensity distribution by the neural network model; and a learning step of training the neural network model in reference to a result of the evaluation, wherein the evaluation step includes calculating a loss function based on an error between a reciprocal of the intensity distribution input to the neural network model and a reciprocal of an intensity distribution calculated in reference to a ray optics model from the layout of the light rays estimated from the intensity distribution by the neural network model, and wherein the learning step includes training the neural network model with use of the loss function.

10. A method for generating a trained neural network model that estimates a layout of light rays corresponding to a target intensity distribution, the method comprising:

an input step of inputting an intensity distribution to a neural network model;

an evaluation step of evaluating the layout of the light rays estimated from the intensity distribution by the neural network model; and a learning step of training the neural network model in reference to a result of the evaluation, wherein the evaluation step includes calculating a loss function based on an error between the intensity distribution input to the neural network model and an intensity distribution calculated in reference to a ray optics model from the layout of the light rays estimated from the intensity distribution by the neural network model, wherein the learning step includes training the neural network model with use of the loss function, and wherein the learning step includes training the neural network model with use of a loss function including a regularization term representing an average of magnitudes of components of a rotation field of the layout of the light rays.

* * * * *